US 6,696,029 B1

(12) United States Patent
Myerson et al.

(10) Patent No.: US 6,696,029 B1
(45) Date of Patent: *Feb. 24, 2004

(54) METHOD FOR THE PURIFICATION OF ZINC OXIDE CONTROLLING PARTICLE SIZE

(76) Inventors: Allan S Myerson, 282 DeKalb Ave., Brooklyn, NY (US) 11205; Peter Robinson, R4 Stn. Main, 6330 Jones Baseline, Fergus, Ontario (CA), N1M 2W5; Stephan Tabah, 4355 Gespesi, Saint Leonard, Quebec (CA), H1R 1G4

( * ) Notice: Subject to any disclaimer, the term of this patent is extended or adjusted under 35 U.S.C. 154(b) by 0 days.

This patent is subject to a terminal disclaimer.

(21) Appl. No.: 08/594,349

(22) Filed: Jan. 29, 1996

Related U.S. Application Data

(63) Continuation-in-part of application No. 08/439,352, filed on May 11, 1995, now Pat. No. 5,759,503, which is a continuation-in-part of application No. 08/238,250, filed on May 4, 1994, now Pat. No. 5,464,596, which is a continuation-in-part of application No. 07/953,645, filed on Sep. 29, 1992, now abandoned, which is a continuation-in-part of application No. 07/820,987, filed on Jan. 15, 1992, now Pat. No. 5,208,004.

(51) Int. Cl.[7] .......................... C01G 9/00; B01D 11/00; C21B 15/00; C22B 19/20
(52) U.S. Cl. .................. 423/101; 423/109; 423/622; 75/724; 75/725; 75/753; 75/766; 75/961
(58) Field of Search ................................. 423/101, 109, 423/622; 23/297, 299; 75/724, 725, 753, 766, 961

(56) References Cited

U.S. PATENT DOCUMENTS

| | | | |
|---|---|---|---|
| 3,849,121 A | | 11/1974 | Burrows |
| 4,071,357 A | | 1/1978 | Peters |
| 4,155,821 A | | 5/1979 | Grontoft |
| 4,292,147 A | | 9/1981 | Fray |
| 5,208,004 A | * | 5/1993 | Myerson |
| 5,942,198 A | * | 8/1999 | Myerson et al. |

* cited by examiner

Primary Examiner—Steven Bos
(74) Attorney, Agent, or Firm—Technoprop Colton LLC

(57) ABSTRACT

A method for the recovery of high purity zinc oxide products, and optionally iron-carbon feedstocks, from industrial waste streams containing zinc oxide and/or iron. The waste streams preliminary can be treated by adding carbon and an ammonium chloride solution, separating any undissolved components from the solution, displacing undesired metal ions from the solution using zinc metal, treating the solution to remove therefrom zinc compounds, and further treating the zinc compounds and the undissolved components, as necessary, resulting in the zinc products and the optional iron-carbon feedbacks. Once the zinc oxide has been recovered, the purification process is used to further purify the zinc oxide to obtain zinc oxide which is at least 99.8% pure and which has predeterminable purity and particle characteristics. Various zinc compounds may then be quickly, easily, and economically produced from this recovered zinc oxide.

19 Claims, 8 Drawing Sheets

METHOD FOR THE PURIFICATION OF ZINC OXIDE CONTROLLING PARTICLE SIZE

STATEMENT OF RELATED APPLICATIONS

This application is a continuation-in-part of application Ser. No. 08/439,352 filed on May 11, 1995, U.S. Pat. No. 5,759,503, which is a continuation-in-part of application Ser. No. 08/238,250 filed on May 4, 1994, U.S. Pat. No. 5,464,596, which is a continuation-in-part of application Ser. No. 07/953,645 filed on Sep. 29, 1992, abandoned, which is a continuation-in-part of application Ser. No. 07/820,987 filed on Jan. 15, 1992, which issued as U.S. Pat. No. 5,208,004 on May 4, 1993.

BACKGROUND OF THE INVENTION

1. Field of the Invention

Many of the uses of zinc oxide require that the zinc oxide have certain particular size, shape and purity characteristics. Therefore, many grades of zinc oxide having different purity and particle characteristics have been developed to meet the diverse industry requirements. Today, most zinc oxide is made by the so called French Process which involves controlled burning of zinc metal vapor in air to obtain zinc oxide having exceptional chemical purity. The present invention provides a zinc oxide purification process which involves precipitating zinc oxide in such a manner that the desired purity and particle characteristics can be obtained. One method to control particle size is through the control of the conditions of the washing step. Additionally, although the zinc oxide purification process preferably utilizes a sodium hydroxide solution as the intermediate, the purification process of the present invention also provides for preparation of zinc oxide having particular purity and particle characteristics by utilizing intermediates such as ammonium chloride liquor, ammonium sulfate, ammonium phosphate, potassium hydroxide, ammonia/ammonium oxalate and ammonia/ammonium carbonate solutions. Once the zinc oxide has been dissolved in the solution, controlled dilution results in the precipitation of zinc oxide having predetermined purity and particle characteristics.

The present invention relates generally to a process for the recovery of zinc products including essentially pure zinc oxide and, optionally, an iron-carbon residual from industrial waste streams comprising zinc compounds and iron compounds. The present invention relates more specifically to a process subjecting a waste materials stream comprising zinc compounds and iron compounds, such as electric arc furnace (EAF) dust, to a combination of leaching and reducing steps, for the recovery of essentially pure zinc oxide in a recycling operation which recycles process solutions for reuse, and produces a cake product from undissolved iron and carbon compounds which can be used as a feedstock for steel mills. Once the essentially pure zinc oxide has been recovered, the zinc oxide is further purified by a process which is preferably based on the solubility of zinc oxide in a concentrated sodium hydroxide solution. This final purification process can be controlled in such a manner that the particle size and surface area of the zinc oxide produced can be controlled. Additionally, zinc compounds can be quickly, easily, and economically, synthesized from the aqueous zinc oxide slurry resulting from this process.

2. Prior Art

Zinc oxide typically is a coarse white or grayish powder which has a variety of uses including as an accelerator activator, as a pigment, as a dietary supplement and in the semiconductor field. Zinc oxide is found in commercial by-products including waste material streams such as fly ash and flue dust. Methods for recovering zinc oxides are known in the art, including recovering zinc oxide from industrial waste materials. Such previous methods have included leaching with mineral acid, caustic soda, ammonium hydroxide, and ammonium carbonate solutions. However, these methods have low yields of zinc oxide and typically do not recover pure zinc oxide, the recovered zinc oxide being contaminated with other metal salts. Therefore, in order to obtain pure zinc oxide, subsequent roasting and evaporation processes were necessary.

U.S. Pat. No. 3,849,121 to Burrows, now expired but which was assigned to a principal of the assignee of the present invention, discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out the iron oxides and waste metals. However, the material obtained in the last step is a mixture of a small amount of zinc oxide, hydrated zinc phases which can include hydrates of zinc oxide and zinc hydroxide, as well as other phases and a large amount of diamino zinc dichloride $Zn(NH_3)_2Cl_2$ or other similar compounds containing zinc and chlorine ions. Currently, the Burrows method is not economically viable because of Environmental Protection Agency guidelines established subsequent to the issuance of the Burrows patent. Additionally, the Burrows method is not a continuous method and, therefore, is not economical as a continuous process.

The first step in the Burrows patent is the treating of the EAF dust with an ammonium chloride solution. The action of the treatment is the leaching of zinc oxide, lead oxide and cadmium oxide in the solution without any leaching of the iron oxides present. Twenty to fifty percent of the zinc present in the Burrows dust is in the form of an iron-zinc complex (known as a spinel) which cannot be leached by the ammonium chloride solution. The Burrows process therefore cannot leach and recover a significant portion of zinc present in the EAF dust.

The second step in the Burrows process is cementation in which the solution obtained from the initial leach is filtered to remove any remaining solids and then zinc dust is added. The zinc dust causes an electrochemical reaction which causes the lead and cadmium to deposit on the zinc particles. Burrows does not teach the need to remove the lead and cadmium in this step efficiently without using a large amount of zinc. If the process requires too much zinc in this step, it will not be economically viable. The zinc powder when added tends to clump together reducing the available surface area and requiring the addition of more zinc.

The third step in the Burrows patent then takes the filtrate from the cementation process and cools the filtrate and obtains what are called "zinc oxide" crystals. Burrows indicates that these crystals range in size up to ⅜ of an inch. Burrows does not produce zinc oxide of any degree of purity; x-ray diffraction figures clearly show that upon crystallization there is a mixture of many phases. Washing the crystals is not sufficient to purify the material to zinc oxide since zinc hydroxide and hydrates are also present, so that a drying step is necessary. In addition, the control of the size of the zinc oxide along with the purity is crucial.

Commercial zinc oxide normally has a requirement that 99% of the particles fit through 325 mesh (44 microns). Burrows indicates no method of cooling or controlling either purity or size, and the particles produced do not meet commercial requirements. Further, a significant portion of the ammonium chloride is lost in the crystal washing step when the diamino zinc dichloride decomposes.

Waste metal process dust typically has varying amounts of lead, cadmium and other metals contained in the dust. For various reasons, it is desirable to remove such metals from the waste metal dust, for example to recycle the lead and cadmium and/or to prevent introduction of the lead and cadmium into the atmosphere. The Burrows patent includes a method for removing dissolved lead and cadmium from the ammonium chloride solutions which have been used to treat the waste metal dust by the addition of powdered zinc dust to the ammonium chloride solutions. The resulting electrochemical reaction forms elemental lead deposits on the surface of the powdered zinc dust. For this reaction to proceed, a large surface area of zinc initially must be present because as the lead covers the zinc dust particle, the particle becomes no longer available for the electrochemical reaction. For this reason, very fine powder is used which, unfortunately, immediately aggregates to form large clumps which sink to the bottom of the vessel. Rapid agitation does not prevent this from happening. Because of the aggregation of zinc, a large amount of zinc must be added to remove all of the lead, a poor practice for economic reasons. Further, if it is desired to separate the lead and some cadmium from the zinc so that all of these metals can be sold or reused, the higher the zinc concentration in the metals, the larger the mass to be processed per unit mass of zinc.

U.S. Pat. No. 4,071,357 to Peters discloses a method for recovering metal values which includes a steam distillation step and a cacining step to precipitate zinc carbonate and to convert the zinc carbonate to zinc oxide, respectively. Peters further discloses the use of a solution containing approximately equal amounts of ammonia and carbon dioxide to leach the flue dust at room temperature, resulting in the extraction of only about half of the zinc in the dust, almost 7% of the iron, less than 5% of the lead, and less than half of the cadmium.

Steam distillation is directly contrary to temperature lowering; steam distillation precipitates zinc carbonate, other carbonates and iron impurities, whereas temperature lowering advantageously precipitates a number of crystalline zinc compounds. Steam distillation also disadvantageously results in an increase in temperature which drives off ammonia and carbon dioxide, resulting in the precipitation of iron impurities and then zinc carbonate and other dissolved metals. The purity of the zinc carbonate obtained depends on the rate of steam distillation and the efficiency of solids separation as a function of time. Calcining at temperatures between 200° C. and 1100° C. converts the zinc carbonate to zinc oxide, whereas washing and drying at temperatures between 100° C. and 200° C. converts the zinc compounds to zinc oxide. In addition to the advantages of temperature lowering, the present process also employs a 23% $NH_4Cl$ solution at temperatures ranging from 90–100° C., and has several distinct advantages over the Peters process:

1. The solubility of zinc and zinc oxide is relatively high in $NH_4Cl$ solution which is important to the efficiency of the present process in terms of the rate of the leaching, the mass of dust that can be processed, and the ability to recycle the solution. The rate of the leaching (which is a dissolution process) is a function of the difference between the zinc concentration in solution and the saturation concentration; the higher the saturation concentration the more rapid the leaching. The present process leaches for only 1 hour, while the Peters process leaches for at least several hours. In addition, the ammonium chloride solution has the added property that the solubility of zinc and zinc oxide in the solution declines rapidly with temperature reduction, which is the basis for the crystallization-based separation which is used later in the present process.

2. Lead and lead oxide, as well as cadmium and cadmium oxide, are soluble in the ammonium chloride solution while iron oxide is virtually insoluble. During the leaching process of the present invention, 95–100% of the zinc present as zinc oxide is extracted, compared to about 55% in Peters; 50–70% of the lead present is removed, compared to less than 5% in Peters; and 50–70% of the cadmium is removed, compared to less than half in Peters. In effect, Peters does not remove a significant amount of the impurities so as to leave an acceptably clean effluent. Peters indicates that his residue, which is high in lead and is a hazardous waste, is discarded. By leaching out a significant portion of the lead and cadmium, the present process produces a material which can be used by the steel producer as they use scrap metal.

3. Peters adds powdered zinc to the solution, which has a tendency to clump reducing the surface area available for the dissolution of the zinc and the plating of the lead and cadmium. The present process teaches a method to minimize this effect through the use of an organic dispersant.

In the present process the filtrate from the cementation step is already hot (90–110° C.) and contains a large amount of dissolved zinc with small amounts of trace impurities. Upon controlled cooling of the solution, crystals of zinc salts begin to appear. Control of the cooling rate and temperature versus time profile is important in controlling the size distribution of the crystals and in reducing or eliminating many of the impurities which might occur. This is especially true of included solution; control of the crystallization can reduce this to virtually zero. In addition, since crystallization is based on differential solubility, and none of the impurities is present in a concentration which can crystallize, the zinc salts are virtually free of any metal impurities.

The final purification step in Peters is a calcining of the zinc carbonate at 600° C. to zinc oxide. In the present process, the mixture of zinc oxide hydrates and diamino zinc dichloride are suspended in hot (90–100° C.) water. The zinc oxide is not soluble; however, the diamino zinc dichloride is very soluble and completely dissolves. The remaining solid which is zinc oxide hydrates is then filtered and dried at 100–350° C. to remove the water of hydration. The result is a very pure zinc oxide powder of controlled particle size.

Another process offered by Engitec Impianti SpA, of Milan, Italy purports to recover zinc metal and lead cement directly from EAF flue dust using an electrowinning technology. Electrowinning is the technique of extracting a metal from its soluble salt by an electrolytic cell Typically, it is used in the recovery of zinc by subjecting the zinc salt in solution to electrolysis and electrodepositing the elemental metal on a zinc cathode in the electrolytic cell In the Engitec process, the EAF flue dust is leached with a spent electrolyte, such as ammonium chloride, which dissolves the zinc, lead, copper and cadmium in the EAF dust into solution while leaving the iron in solid form. The solution containing the dissolved zinc is placed in an electrolytic cell which draws the zinc from the solution onto a cathode plate, while the other heavy metals are filtered out in solid form into cement cakes. Engitec claims to obtain a zinc yield that is 99.5% pure and a lead cake consisting of a minimum of 70% lead. In effect, the Engitec process takes the product solution from the Burrows process and subjects it to electrowinuing. A neutral solution of ammonium and sodium chlorides is heated to between 70° C. and 80° C. The EAF dust is mixed into the chlorides solution in which the zinc and heavy metals are dissolved. The iron, calcium, magnesium and aluminum oxides are insoluble in the chlorides solution. After leaching and residue filtration, the solution is purified by cementation using zinc granules or powder. After removal of the cement, consisting of lead, copper, silver and cadmium, the purified solution is fed to the electrolysis cell.

Apparently, the electrolysis of the zinc amino complex in the purified solution occurs in a conventional open cell using a titanium permanent blank cathode and a proprietary graphite anode. In the electrolysis cell the zinc plates on the titanium cathode. However, the deposition time for the zinc is 24 to 48 hours, depending on the current density. In addition to the electrowiriing of zinc, the electrolysis cell consumes ammonia and evolves nitrogen. Because of this, in order to maintain the pH of the electrolyte in the desired range of 6 to 6.5, additional ammonium must be added to the cell in the range of 180 kg per ton of product zinc.

Although the Engitec process appears to be theoretically possible, the use of an electrolysis cell adds additional costs to the process due to the energy consumption of an electrolysis cell, the consumption of ammonia in the electrolysis cell, additional costs in handling nitrogen evolved in the electrolysis cell, and the cost of maintaining the components of the electrolysis cell itself. For example, the titanium cathode can be costly, while the apparently proprietary graphite anode also may be costly. The Engitec process also results in the formation of metallic zinc. Although metallic zinc has a certain value, zinc oxide has more value. The residue removed from the Engitec process is composed primarily of iron oxide and zinc ferrite. Iron oxide can be used in the steel making process. The presence of zinc ferrite likely is not a significant detriment to the use of the residue from the Engitec process, but it does inject an additional impurity into any future process. It would be more advantageous to obtain a residue comprising primarily iron oxide with no zinc ferrite or other impurities, or only an insignificant amount of such other impurities.

The electrowinning of metals from chloride solutions is known in the art. U.S. Pat. No. 4,155,821 to Grontoft discloses and claims a method for recovering chlorine using electrolytic separation. Chlorine and metal are produced from a chlorine containing electrolyte by an electrolytic process having an anode surrounded by a membrane connected to a hood. The process is maintained at a partial vacuum so that any chlorine gas generated by the anode together with some of the electrolyte is drawn away from the anode. The vacuum also is devised to control redifussion of chlorine containing electrolyte back through the membrane into the surrounding electrolyte. The process is for use with nickel recovery where the nickel chloride containing electrolyte is introduced at such a rate that the pH is maintained below a certain level. The process also may be used for cobalt recovery.

The electodeposition of zinc from chloride solutions also is known in the art. U.S. Pat. No. 4,292,147 to Fray discloses and claims a method for the electrodeposition of cadmium or zinc from chloride solutions derived from chlorine leaching of materials. An aqueous solution having 15 to 30% by weight of zinc or cadmium chloride is electrolyzed at a pH of 2 to 3.5 at a temperature of below 35° C. with gas agitation at a current density above 100 A/m$^2$ to form coherent zinc or cadmium at the cathode. A typical zinc containing material such as flue dust is leached with a saturated chlorine solution, preferably in the presence of chlorine hydrate. The zinc chloride solution preferably contains 20 to 30% by weight zinc or cadmium chloride and up to 20% by weight alkaline metal or ammonium chloride. The electrolysis preferably is carried out at 0° C. to 9° C. and above 2500 A/m$^2$ with intermittent current reversal. Chlorine hydrate liberated at the anode may be recycled to affect leaching.

In addition to the uses of zinc oxide as a pigment, there are several important zinc compounds which are synthesized from zinc oxide. Methods to make various zinc compounds from zinc oxide are well known in the art. The methods usually involve the reaction of zinc oxide with the appropriate acid to form the zinc compound. Generally, commercial zinc oxide is first made by the combustion of zinc vapor in air, resulting in dry powdered zinc oxide. This dry powder must first be suspended or dissolved in an aqueous solution prior to treatment with the appropriate acid to produce the desired compound. In many cases the zinc oxide is dissolved in an aqueous solution of an acid. The zinc compounds may be present in solution or alternatively may be precipitated as a solid.

Thus, there exists a need for a method which will recover high purity zinc oxide products from industrial waste streams. The method disclosed below relates to the preparation of essentially pure zinc oxide. In addition, since zinc oxide is the desired product and diamino zinc dichloride is undesired, the method disclosed herein demonstrates how to increase the formation of desired zinc products and decrease the formation of diamino zinc dichloride. Furthermore, once the essentially pure zinc oxide has been obtained, the zinc oxide is further purified by a process which is based on the solubility of zinc oxide in a concentrated sodium hydroxide solution. This purification process can be controlled to produce zinc oxide having a desired size and surface area.

There also exists a need for a method which will allow the recovery of iron oxide from industrial waste streams which can be used with little or no additional treatment as the feedstock for other processes. Producing an iron oxide with a minimum amount of impurities, such as zinc ferrite, is advantageous because the iron oxide can be used as the feedstock for steel production processes. A method which results in the recovery of iron oxide would have additional value in that the iron oxide could be sold for use in other processes.

There also exists a need for a quick, easy, and economical method for the synthesis of various zinc compounds from recovered zinc oxide.

Additionally, with specific regard to this disclosure, there exists a need for methods of purify zinc oxide which allows a highly purified zinc oxide to be obtained which has predeterminable and controllable purity, and particle size and shape characteristics.

BRIEF SUMMARY OF THE INVENTION

The present invention satisfies these needs in a method which recovers essentially pure zinc oxide ultimately from waste material containing zinc or zinc oxide. Along with the essential pure zinc oxide, zinc metal can be recovered, along with values of other metallic elements contained in the waste material such as lead, silver, and cadmium. The solutions used in the process are recycled such that the process does not have any liquid wastes. The solids recovered from the process, namely, the zinc oxide, zinc, metal values, and other residues all can be used in other processes. One such residue, an iron oxide cake, is of such a quality that it can be used directly as the feedstock for the typical steel production process. The zinc oxide recovered in this preliminary process is further purified by the preferred process which is based on the solubility of zinc oxide in a concentrated sodium hydroxide solution. This purification process can be controlled to produce zinc oxide having a desired size and surface area.

One method for purifying zinc oxide to obtain zinc oxide crystals having predetermined purity and particle characteristics comprises the steps of dissolving a zinc oxide containing product in an intermediate, filtering out any undissolved materials, precipitating zinc oxide crystals out of the intermediate in a controlled manner such that the zinc oxide crystals have predetermined purity and particle characteristics, filtering out the zinc oxide crystals, washing the zinc oxide crystals, and then drying the zinc oxide crystals.

The intermediate is preferably selected from the group consisting of sodium hydroxide, ammonium sulfate, ammonium chloride liquor, ammonium phosphate, potassium hydroxide, ammonia/ammonium oxalate, and ammonia/ammonium carbonate solutions. Most preferably, the intermediate is a concentrated 50%–70% sodium hydroxide solution. The precipitation step is accomplished by diluting the solution at a predetermined rate by a factor ranging from 3 to 30 at a temperature ranging from about 25° C. to 100° C. at atmospheric pressure, and even over 100° C. at pressures greater than atmospheric pressure, to precipitate the zinc oxide crystals.

The preferred method for purifying zinc oxide to obtain zinc oxide crystals having predetermined purity and particle characteristics comprises controlling the method by which the intermediate, preferably sodium hydroxide, is added to the zinc oxide to control the particle size of the resulting purified zinc oxide. Preferably, the sodium hydroxide is dispersed into droplets averaging in size from 100 to 300 microns, with 150–250 microns being preferred, and the best results being obtained at 180 microns. Generally, the smaller the droplet size the larger the surface area of the resulting zinc oxide particles.

Once the substantially pure zinc oxide is recovered from the preliminary process, the purification process takes place resulting in zinc oxide which is at least 99.8% pure. In the preferred embodiment, this purification process is based on the solubility of zinc oxide in a concentrated sodium hydroxide solution. In the preferred process, zinc oxide is dissolved in a concentrated 50%–70% sodium hydroxide solution. Most of the metal impurities contained in the zinc oxide will not dissolve, including manganese, iron and cadmium. Any lead, calcium or chloride contained in the zinc oxide will dissolve. The solution is then filtered to remove the undissolved solids, which are then recycled back to the metals recovery section of the plant and thereby returned to the recycling process of the present invention.

The solution is then diluted by a factor ranging from 3 to 30, and preferably 3 to 8. The dilution preferably is performed hot at, temperatures at or above 70° C., preferably at temperatures ranging between 90 to 100° C., so that the dilution step favors the formation of zinc oxide as compared to zinc hydroxide. The zinc oxide crystals which form are then filtered out, sent to a wash tank where they are washed with water, and sent to a dryer where they are dried, preferably at a temperature of 160° C.

The diluted sodium hydroxide solution then is sent to an evaporated condenser where the solution is concentrated back to 50%–70% sodium hydroxide so that it can be reused. When a steady state has been achieved, this step will result in the formation of sodium chloride crystals which will be filtered out of the solution and recovered. This is because sodium chloride formed by the chloride present in the zinc oxide is less soluble in a concentrated sodium hydroxide solution than in dilute sodium hydroxide. After the sodium chloride is filtered out, the concentrated solution can be reused in the purification process of the present invention.

Periodically, lead will be removed from the sodium hydroxide solution by cementation. This involves the addition of zinc dust which will displace the lead in solution. The lead will be filtered out and sent to the lead recovery portion of the plant.

By controlling the manner in which the zinc oxide precipitates out of the intermediate during the zinc oxide crystallization step, it is possible to control the particle size hence the surface area of the zinc oxide produced as well as the purity. Furthermore, the purification process of the present invention can be used to purify zinc oxide obtained from other sources.

Therefore, it is an object of the present invention to provide a method for recovering zinc oxide from waste materials, such as fly ash or flue dust, which contain other metals, such as iron oxide, lead oxide, cadmium and other materials.

Yet another object of the present invention is to provide a method for recovering zinc oxide in which all leaching and washing solutions are recycled for further use, and no leaching or washing solutions are disposed of into the sewers or the environment.

Still another object of the present invention is to provide a method for recovering zinc oxide which also results in the precipitation in elemental form of any lead and cadmium metals contained in the starting materials.

It is another object of the present invention to provide a method for recovering zinc oxide in which all of the zinc can be recycled so that all of the zinc eventually will be converted to zinc oxide.

Still another object of the present invention is to provide a method for recovering iron oxide from waste materials, such as fly ash or flue dust, which contain other metals, such as zinc, lead oxide, and cadmium.

A further object of the present invention is to provide a method for recovering iron oxide which can be used as is as a feedstock for steel production processes.

Another object of the present invention is to provide a method for recovering zinc metal, zinc oxide and/or iron oxide which is economical, quick and efficient.

A further object of the present invention is to provide methods of purifying zinc oxide which allows a highly purified zinc oxide to be obtained which has predeterminable and controllable purity, and particle size and shape characteristics.

A final object of the present invention is to provide a quick, easy, and economical method for the synthesis of various zinc compounds from recovered zinc oxide.

These objects and other objects, features and advantages of the present invention will become apparent to one skilled in the art when the following Detailed Description of a Preferred Embodiment is read in conjunction with the attached figures.

DETAILED DESCRIPTION OF A PREFERRED EMBODIMENT

Figure 1A:
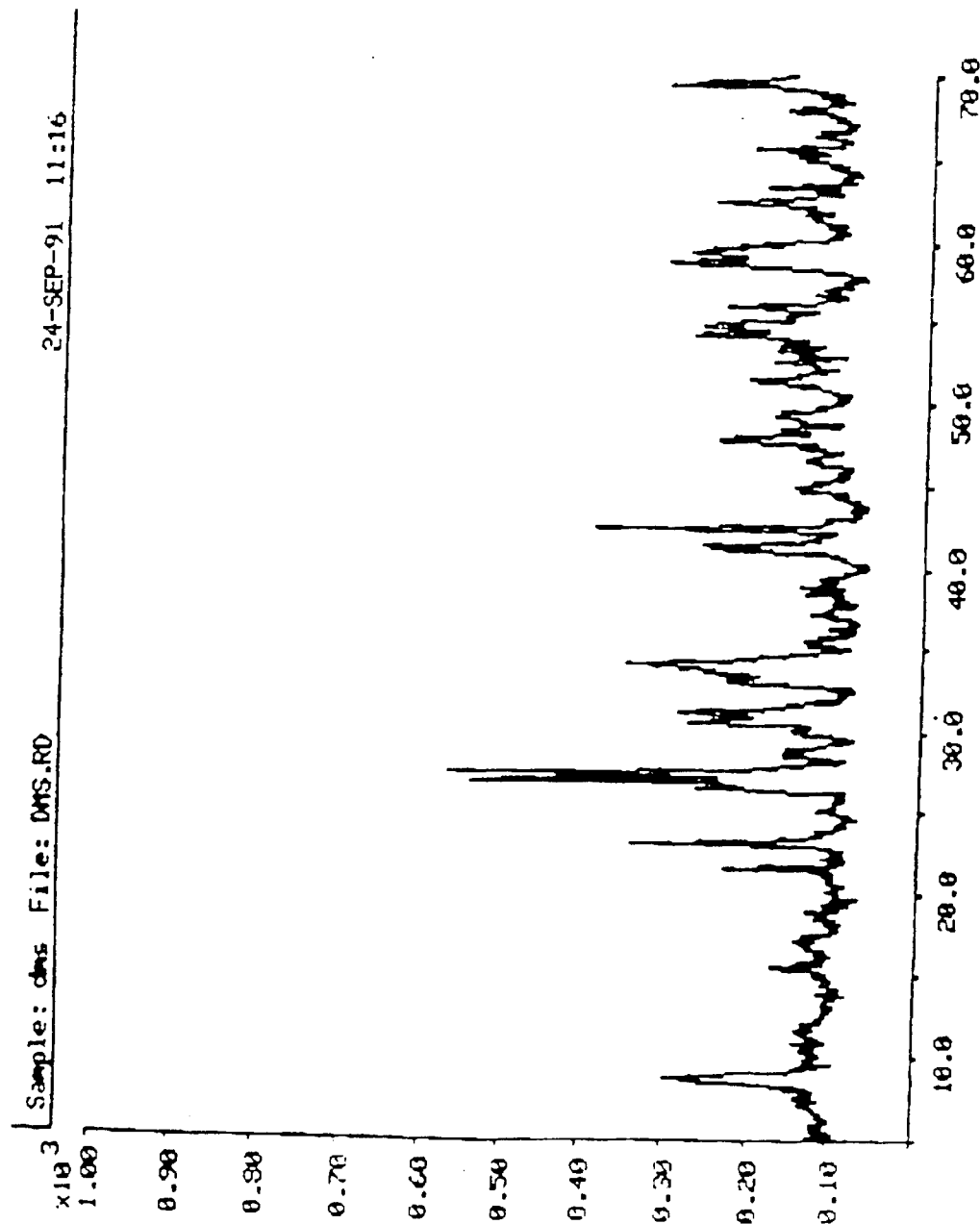
FIG. 1A is an X-ray diffraction of the precipitate obtained in Example 1 (many phases).

The method for recovering and purifying zinc oxide disclosed herein is carried out in its best mode in recovering these materials from the waste streams of industrial or other processes. A typical industrial waste stream used is a flue dust where the charge contains galvanized steel having the following percent composition:

TABLE I

Analysis of Flue Dust

| Component | Weight Percent |
|---|---|
| zinc oxide | 39.64 |
| iron oxide | 36.74 |
| lead oxide | 5.72 |
| inert materials[1] | 9.10 |
| calcium oxide | 2.80 |
| potassium oxide | 2.41 |
| manganese oxide | 1.29 |
| tin oxide | 1.13 |
| aluminum oxide | 0.38 |
| magnesium oxide | 0.33 |
| chromium oxide | 0.16 |
| copper oxide | 0.06 |
| silver | 0.05 |
| unidentified materials[2] | 0.22 |
| TOTAL | 100.00 |

[1]siliceous material, such as slag, with carbon granules occluded.
[2]molybdenum, antimony, indium, cadmium, germanium, bismuth, titanium, nickel and boron.

I. GENERAL DESCRIPTION OF A PROCESS FOR PRODUCING A ZINC OXIDE PRODUCT SUITABLE FOR PURIFICATION BY THE PRESENT PROCESS

A waste material, typically a fly ash or flue dust such as EAF, is leached with an ammonium chloride solution resulting in a product solution and undissolved materials. The product solution and the undissolved materials are separated, with both the product solution and the undissolved materials being further treated to recover valuable components. Zinc metal is added to the product solution to cement out any lead and cadmium contained in the product solution. The remaining product solution is rich in zinc compounds.

The remaining product solution then can be treated in two manners. First, the remaining product solution can be cooled thereby precipitating the zinc components from the product solution as a mixture of crystallized zinc compounds. These crystallized zinc compounds are separated from the product solution, washed and then dried at elevated temperatures, resulting in a zinc oxide product of 99% or greater purity. Second, the remaining product solution can be subjected to electrolysis in which zinc metal plates onto the cathode of the electrolysis cell. Any remaining product solution after crystallization or electrolysis is recycled back to treat incoming waste material The zinc oxide of 99% or greater purity is then further purified by a purification process which produces zinc oxide which is at least 99.8% pure. This purification process is preferably based on the solubility of zinc oxide in a concentrated sodium hydroxide solution. However, intermediates other than sodium hydroxide can also be used. The result is zinc oxide which is even of greater purity. Furthermore, the process can be controlled to obtain zinc oxide having a desired size and surface area.

The undissolved material separated from the product solution is rich in iron oxide, and typically has some impurities such as zinc ferrite. The undissolved materials can be used as a feedstock for steel mills so long as the quantity of impurities is not too great. It is preferable to remove the impurities from the iron oxide prior to using the iron oxide as a feedstock. Reducing the iron oxide to direct-reduced iron (DRI) also is desired as DRI can be used to replace part or all of the steel scrap charge.

The iron oxide in the undissolved materials can be reduced to DRI in two manners. First, carbon, in the form of activated carbon, carbon dust, carbon pellets or the like, can be introduced to the ammonium chloride and waste material mixture during the leaching process. The carbon reduces the iron oxide resulting in DRI. Second, the carbon can be introduced to the dried undissolved material cake using a ribbon blender. The carbon will react with the iron oxide, reducing the iron oxide to DRI. Adding heat to this process assists in the reduction.

Prior to be leached by the ammonium chloride solution, the waste material, typically including franklinite and magnetite, may be roasted at temperatures greater than 500° C. for a predetermined period of time. The roasting causes a decomposition of the franklinite zinc oxide-iron oxide complex into zinc oxide, iron oxide and other components. The roasting process generally comprises the steps of adding heat to the waste material and/or passing heated reducing gases through the waste material. Although all reducing gases are suitable, hydrogen and carbon-containing gases such as carbon dioxide are preferred, as well as mixing carbon (activated) with the material and roasting in a gas containing oxygen. While some iron oxide is reduced from Fe$_2$O$_3$ and Fe$_3$O$_4$ to FeO, no elemental iron is produced during the roasting step. Additionally, iron and iron oxides are not soluble to any degree in the basic ammonium chloride solution.

The EAF dust can be heated in a reducing atmosphere to reduce the iron-zinc spinel into zinc oxide and iron oxide typically prior to leaching with ammonium chloride. An initial leach of the waste material can be done, followed by the roasting followed by another leach. Dispersants are used in the ammonium chloride solution to keep the zinc powder from clumping and thus increasing the efficiency of the cementation process. This method minimizes the formation of the diamino zinc dichloride, thus improving the washing step. In addition, the effect of cooling profile on the particle size allows particle size control in the present process. This process also provides that the wash water stream must also be recycled as well as the steady state conditions which will be achieved with the recycle.

In the leaching step, the zinc and/or zinc oxide dissolves in the ammonium chloride solution along with other metal oxides contained in the waste material, such as lead oxide and cadmium oxide. The resultant solution is filtered to remove the undissolved materials, such as iron oxides and inert materials such as silicates, which will not dissolve in the ammonium chloride solution. Finely powdered zinc metal can be added to the resultant solution at a temperature of about 90° C. or above. A dispersant may be added at this point to prevent the finely powdered zinc metal from flocculating and becoming less effective. Through an electrochemical reaction, lead metal and some cadmium plates out on the surface of the zinc metal particles. The addition of sufficient powdered zinc metal results in the removal of virtually all of the lead from the resultant solution. The resultant solution is filtered to remove the solid lead, zinc and cadmium. These initial steps, with the exception of adding the dispersant, have been generally disclosed in the prior art, yet have not resulted in the production of essentially pure zinc oxide.

The filtrate then is cooled to a temperature of between about 20° C. and 60° C. resulting in the crystallization of a mixture of zinc compounds. The crystallization step helps to achieve a high purity zinc oxide of controlled particle size. During the crystallization step, the filtrate can be cooled to its final temperature by controlling the cooling profile. The use of a reverse natural cooling profile is preferred as its results in a more desirable nucleation to crystal growth ratio. The filtrate contains a significant amount of diamino zinc dichloride, or other complex compounds which involve zinc amino complexes, as well as hydrated zinc oxide and hydroxide species. The solid precipitate is filtered from the solution, the solution recycled, and the solid precipitate washed with water at a temperature between about 25° C. and 100° C. The diamino zinc dichloride dissolves in the wash water leaving the majority of the hydrated zinc oxide species as the precipitated solid. The precipitated solid then is filtered from the solution, the resulting solution being recycled, and the solid precipitate placed in a drying oven at a temperature above 100° C. and preferably between about 100° C. and 350° C., resulting in a dry white zinc oxide powder. These additional steps allow the production and recovery of substantially pure zinc oxide. Alternatively, the filtrate can be subjected to electrolysis to recover zinc metal.

Generally, the zinc oxide production process comprises the steps of:
   a. roasting the waste material at an elevated temperature and in a reducing atmosphere;
   b. treating the waste material with an ammonium chloride solution at an elevated temperature to form a product solution which comprises dissolved zinc and dissolved zinc oxide whereby any iron oxide in the waste material will not go into solution;
   c. separating the product solution from any undissolved materials present in the product solution including any of the iron oxide;
   d. adding zinc metal and a dispersant to the product solution whereby any lead and cadmium ions contained within the product solution are displaced by the zinc metal and precipitate out of the product solution as lead and cadmium metals and the dispersant is selected from the group consisting of dispersants which will prevent the aggregation of said zinc metal;
   e. separating the product solution from the lead and cadmium metals;
   f. lowering the temperature of the product solution thereby precipitating the zinc component as a mixture of crystallized zinc compounds;
   g. separating the precipitated zinc compounds from the product solution;
   h. washing the zinc compounds solids with a wash water thereby solubilizg certain of the zinc compounds;
   i. separating the remaining zinc compounds solids from the solution; and then
   j. drying the remaining zinc compounds solids at a temperature of at least 100° C. whereby the resulting product is zinc oxide of 99% or greater purity.

The process also can comprise a two-stage leaching process for even greater yields of zinc oxide. The two-stage process comprises the steps of:
   a. treating the waste material a first time with an ammonium chloride solution at an elevated temperature to form a first product solution which comprises dissolved zinc constituents whereby any iron oxide in the waste material will not go into solution;
   b. separating the first product solution from the undissolved waste material compounds present in the first product solution including any of the iron oxide;
   c. roasting the undissolved waste material compounds at an elevated temperature and in a reducing atmosphere;
   d. treating the roasted undissolved waste material compounds a second time with the ammonium chloride solution at an elevated temperature to form a second product solution which comprises dissolved zinc constituents whereby any iron oxide remaining in the roasted undissolved waste material compounds will not go into solution;
   e. combining the first and second product solutions to form a combined product solution, maintaining the combined product solution at a temperature of at least 90° C., and adding powdered zinc metal and a dispersant to the combined product solution whereby any lead and cadmium ions contained within the combined product solution are displaced by the zinc metal and precipitate out of the combined product solution as lead and cadmium metals and the dispersant is selected from the group consisting of dispersants which will prevent the aggregation of the zinc metal; and
   f. separating the combined product solution from the lead and cadmium metals.

After the combined product solution is separated from the lead and cadmium metals, the combined product solution is treated similarly to the treatment of the product solution in steps f through j of the general method disclosed above.

An ammonium chloride solution in water is prepared in known quantities and concentrations. If the two-stage leaching process is used, the feed material which contains the zinc species, such as the waste material flue dust described in Table I or any other feed material source which contains zinc or zinc oxide mixed with other metals, is added to the ammonium chloride solution at a temperature of about 90° C. or above. Otherwise, the feed material is roasted. The zinc and/or zinc oxide dissolves in the ammonium chloride solution along with other metal oxides, such as lead oxide and cadmium oxide. The iron oxide does not dissolve in the ammonium chloride solution. The solubility of zinc oxide in ammonium chloride solutions is shown in Table II.

TABLE II

Solubility of ZnO in 23% $NH_4Cl$ solution

| Temperature °C. | g Dissolved/ 100 g $H_2O$ |
|---|---|
| 90 | 14.6 |
| 80 | 13.3 |
| 70 | 8.4 |
| 60 | 5.0 |
| 50 | 3.7 |
| 40 | 2.3 |

A 23% by weight ammonium chloride solution in water at a temperature of at least 90° C. provides the best solubility of zinc oxide. Concentrations of ammonium chloride below about 23% do not dissolve the maximum amount of zinc oxide from the flue dust, and concentrations of ammonium chloride above about 23% tend to precipitate out ammonium chloride along with the zinc oxide when the solution is cooled. Iron oxide and inert materials such as silicates will not dissolve in the preferred solution.

The zinc oxide, as well as smaller concentrations of lead or cadmium oxide, are removed from the initial dust by the dissolution in the ammonium chloride solution. The solid remaining after this leaching step contains zinc, iron, lead and cadmium, and possiebly some other impurities. The remaining solid then is roasted in a reducing atmosphere, typically at a temperature greater than 420° C. and often at 700° C. to 900° C. The reducing atmosphere can be created by using hydrogen gas, simple carbon species gases such as carbon dioxide, or by heating the material in an oxygen containing gas in the presence of elemental carbon. The carbon preferably is in the form of dust or pellets. Typical roasting times are from 30 minutes to 4 hours. As discussed above, the waste dust first may be roasted and second may be leached, omitting the first leaching step.

After the dust has been roasted, it is subjected to a leaching step in 23% by weight ammonium chloride solution in water at a temperature of at least 90° C. Any zinc or zinc oxide formed during the roasting step dissolves in the ammonium chloride solution. The zinc oxide and ammonium chloride solution then is filtered to remove any undissolved material, including the iron oxide. After filtering, for analysis, the solid may be separated out and dried at a temperature of over 100° C., typically between 100° C. and 200° C., for about 30 minutes to 2 hours, typically approximately 1 hour.

To recover the zinc oxide, while the filtered zinc oxide and ammonium chloride solution is still hot, that is at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, zinc and cambium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring. To keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. A discussion of these various materials can be found in the literature, such as Drew, Principles of Industrial Waste Treatment, pages 79–84, which is incorporated herein by reference. Flocon 100 and other members of the Flocon series of maleic-based acrylic oligomers of various molecular weights of water soluble polymers, produced by FMC Corporation, also are effective. Adding the dispersants to a very high ionic strength solution containing a wide variety of ionic species is anathema to standard practice as dispersants often are not soluble in such high ionic strength solutions.

At this stage there is a filtrate rich in zinc compounds and a precipitate of lead, cadmium and other products. The filtrate and precipitate are separated, with the precipitate being further treated, if desired, to capture chemical values. The filtrate may be treated in several manners, two of which are preferred. First, the filtrate may be cooled resulting in the crystallization and recovery of zinc oxide. Second, the filtrate may be subjected to electrolysis resulting in the generation and recovery of metallic zinc.

To recover zinc oxide, the filtrate then is cooled to a temperature of between about 20° C. and 60° C. resulting in the crystallization of a mixture of zinc compounds. The mixture contains a significant amount of diamino zinc dichloride, or other complex compounds which involves zinc amino complexes, hydrated zinc oxides and hydroxide species. Crystallization helps to achieve a high purity zinc oxide of controlled particle size, typically through control of the temperature-time cooling profile. Reverse natural cooling, that is cooling the solution slower at the beginning of the cooling period and faster at the end of the cooling period, is preferred to control the nucleation to crystal growth ratio and, ultimately, the crystal size distribution. The precipitated crystallized solid is filtered from the solution and washed with water at a temperature of between about 25° C. and 100° C. The filtered solution is recycled for further charging with feed material. The diamino zinc dichloride dissolves in water. The solubility of diamino zinc dichloride in water is shown in Table III.

The amount and temperature of the wash water can be selected to achieve a particular size/surface area of the zinc oxide crystals. We have found that at a fixed temperature, the more wash water used, the larger the surface area (smaller particles) and at a fixed amount of wash water, the higher the temperature, the larger the surface area (smaller particles). Any temperature above 25° C. may be used in this process to control the particle characteristics. Temperatures above 100° C. may be used if done under pressure. However, because of the added expense of heating and maintaining a temperature above 100° C., and because ZnOH forms at a greater rate as the temperature decreases below 60° C., it is preferred to use a temperature of 60–100° C. Through variations in the two conditions, using the method disclosed herein, one skilled in the art can produce zinc crystals with a predetermined particle size, and thus, surface area.

TABLE III

Solubility of $Zn(NH_3)_2Cl_2$ in water

| Temperature ° C. | g Dissolved/100 g $H_2O$ |
|---|---|
| 90 | 32 |
| 80 | 24 |
| 40 | 21 |
| 25 | 12.8 |

Very little of the hydrated zinc oxide dissolves in the water. This resultant solution then is filtered to remove the hydrated zinc oxide species. The solid hydrated zinc oxide species filtered from the solution is placed in a drying oven at a temperature of over 100° C. After a sufficient drying period, the resultant dry white powder is essentially pure zinc oxide. The filtrate from the solution is recycled for charging with additional zinc compound mixture.

The zinc oxide may be dried at approximately 100° C. To ensure that the material is free of chloride, however, it is preferable to heat the zinc oxide to a higher temperature. Diamino zinc dichloride decomposes at 271° C. and ammonium chloride sublimes at 340° C. Therefore, heating the zinc oxide to a temperature above 271° C. is useful The drying temperature should be kept below approximately 350° C. to prevent the sublimation of significant amount of ammonium chloride. Therefore, it is preferable to dry the zinc oxide at a temperature in the range of 271° C. to 350° C. Typically, the zinc oxide should be dried in this temperature range for approximately 2 to 60 minutes, and preferably from 5 to 20 minutes. A 10 minute drying time has been found to be a satisfactory average.

As the zinc, lead and cadmium contained in the feed materials are anphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form. The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative amounts of diamino zinc dichloride and zinc oxide species form. Significantly, all of the zinc can be recycled so that all of the zinc eventually will be converted into zinc oxide.

The crystallization step can be done continuously in order to increase the throughput and maximize the zinc oxide yield after the washing and drying step.

The following Examples demonstrate ways to increase the formation of zinc oxide according to this process. Examples 1–7 do not include roasting. Example 8 illustrates the present invention. Examples 11–13 also show variations on the crystallization step, and Example 13 also illustrates the recycle results. X-ray diffraction analyses of the zinc oxide prepared according to these examples indicate the recovery of high purity zinc oxide. Examples 4–18 illustrate the purification process resulting in the desired particle sizes.

EXAMPLE 1

Prior Art

A metal dust of composition listed in Table I of the Burrows patent is added to 23% by weight $NH_4Cl$ solution (30 g $NH_4Cl$ per 100 g $H_2O$), as discussed in the Burrows patent, in the amount of 1 gram of dust per 10 grams of solution. The solution is heated to a temperature of 90° C. and stirred for a period of 1 hour, during which the zinc oxide in the dust dissolves. The remaining solid, which has a composition of approximately 60% iron oxide, 5% calcium oxide, 5% manganese, 30% other materials, is filtered out of the solution. Powdered zinc then is added to the filtrate at 90° C., causing the precipitation of waste metals, the precipitate containing about 60% lead, 40% zinc, 2% cadmium and 8% other metals. The waste metals then are filtered out and the filtrate is cooled to room temperature (between about 18° C. and 30° C.) over a period of about two hours. The solution then contains a white precipitate which is not essentially pure zinc oxide but is a mixture of hydrated zinc phases and diamino zinc dichloride.

EXAMPLE 2

A metal dust of composition listed in Table I is added to 23% weight $NH_4Cl$ solution (30 g $NH_4Cl$ per 100 g $H_2O$). 1 gram of dust is used per 10 grams of solution. The solution is heated to a temperature of 90° C. and stirred for a period of 1 hour. During this period the zinc oxide in the dust dissolves. The remaining solid, having a composition of approximately 60% iron oxide, 5% calcium oxide, 5% manganese, 30% other materials, is filtered out of the solution. Powdered zinc then is added to the filtrate at 90° C. This causes the precipitation of waste metals, the waste metal precipitate containing about 60% lead, 40% zinc, 2% cadmium and 8% other metals. The waste metals then are filtered out and the filtrate is cooled to room temperature (between about 18° C. and 30° C.) over a period of about two hours. The solution then contains a white precipitate.

Figure 1B:
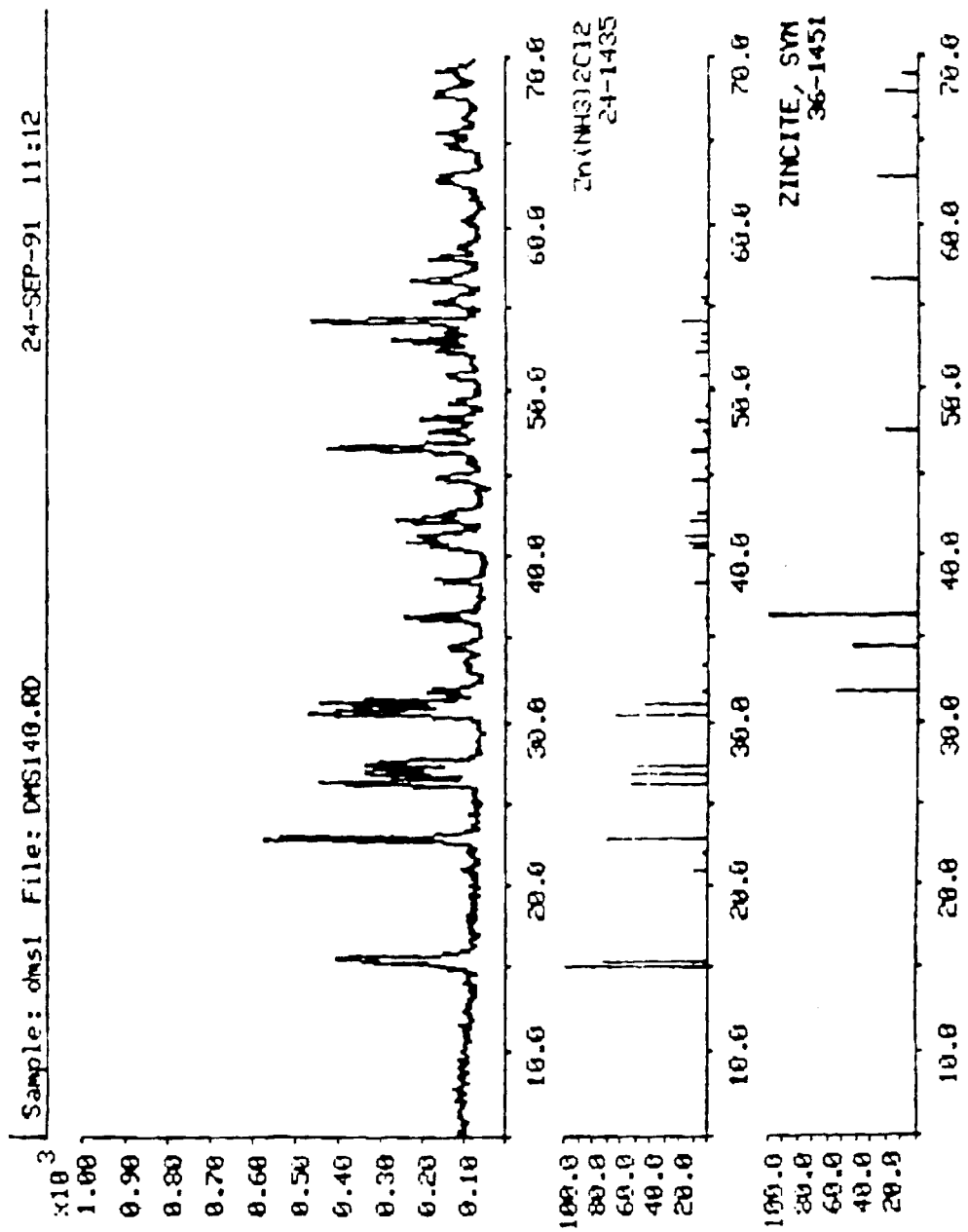
FIG. 1B is an X-ray diffraction of the precipitate after drying ZnO+Zn(NH$_3$)$_2$Cl$_2$.
Figure 1C:
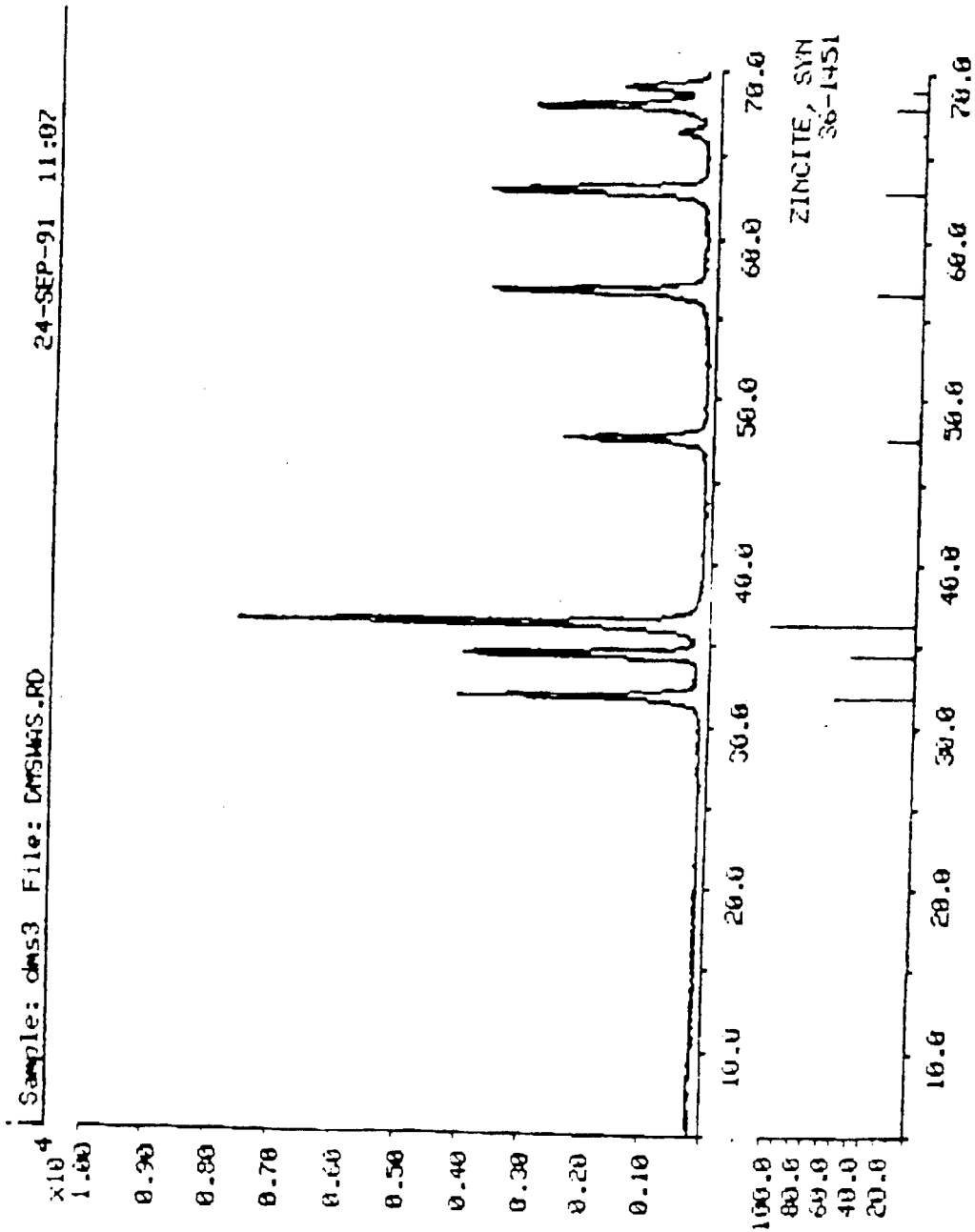
FIG. 1C is an X-ray diffraction of the precipitate after washing and drying ZnO.

As shown in FIG. 1A, X-ray diffraction of the precipitate indicates that it is a mixture of hydrated zinc phases and diamino zinc dichloride. The hydrated zinc phases are virtually insoluble in water; however, the measurements in Table III show that diamino zinc dichloride is quite soluble in water. A portion of the white precipitate was dried and, as shown in FIG. 1B, zinc oxide and diamino zinc dichloride, as well as some other components, are present. The white precipitate then is filtered from the solution and resuspended in water at 90° C. and stirred for a period of one hour. This suspension then is filtered and product dried in an oven at 140° C. As shown in FIG. 1C, the resulting white solid is 99%+zinc oxide. The amount of zinc oxide obtained was 47.8% of the mass of the original precipitate.

The ZnO recovered by this Example also had the following components:

| lead: | 866 ppm |
|---|---|
| potassium: | 45 ppm |
| calcium: | <25 ppm |
| manganese: | <25 ppm |
| chromium: | <25 ppm |

EXAMPLE 3

The procedure of Example 1 is followed until the step in which the zinc containing filtrate is cooled. Since the diamino zinc dichloride is more soluble then the majority of the other possible precipitates in the ammonium chloride solution (except for zinc chloride which is so soluble that it will not appear), the diamino zinc dichloride appears as a larger fraction of the solid as the temperature declines. The filtrate was divided into fractions and each fraction cooled to a different temperature. The resulting solids were than filtered, resuspended in water at 90° C. for one hour, filtered and dried. The result was 99%+zinc oxide in all cases; however, the yield changed with the temperature to which the fraction was cooled as follows:

| Crystallization Temp (° C.) | Percent ZnO Obtained |
|---|---|
| 75 | 65 |
| 70 | 60 |
| 60 | 60 |
| 50 | 50 |

Crystallization at temperatures from 60° C. up improve the yield of ZnO.

EXAMPLE 4

ZnO also can be recovered from the wash water used in the process. Fifty grams of dried zinc phase precipitate (the solid obtained after cooling to room temperature) obtained using the procedure of Example 1 is added to 100 g of $H_2O$ at 90° C. The diamino zinc dichloride dissolves while only a small amount of the other zinc phases dissolve (due to the ammonium chloride which is part of the diamino zinc dichloride). The remaining solid is filtered out and is dried resulting in 99%+zinc oxide. The filtrate is cooled to room temperature and the solid filtered out. The solid is again a mixture of hydrated zinc phases and $Zn(NH_3)_2Cl_2$. The solid is washed in 90° C. water, filtered and dried resulting in 99% ZnO. The yield is 40% ZnO.

The yield also can be improved by crystallizing at higher temperatures. In addition, the same wash water can be used again instead of fresh water since this part of the process relies on the change in $Zn(NH_3)_2$ solubility with temperature.

EXAMPLE 5

Figure 2A:
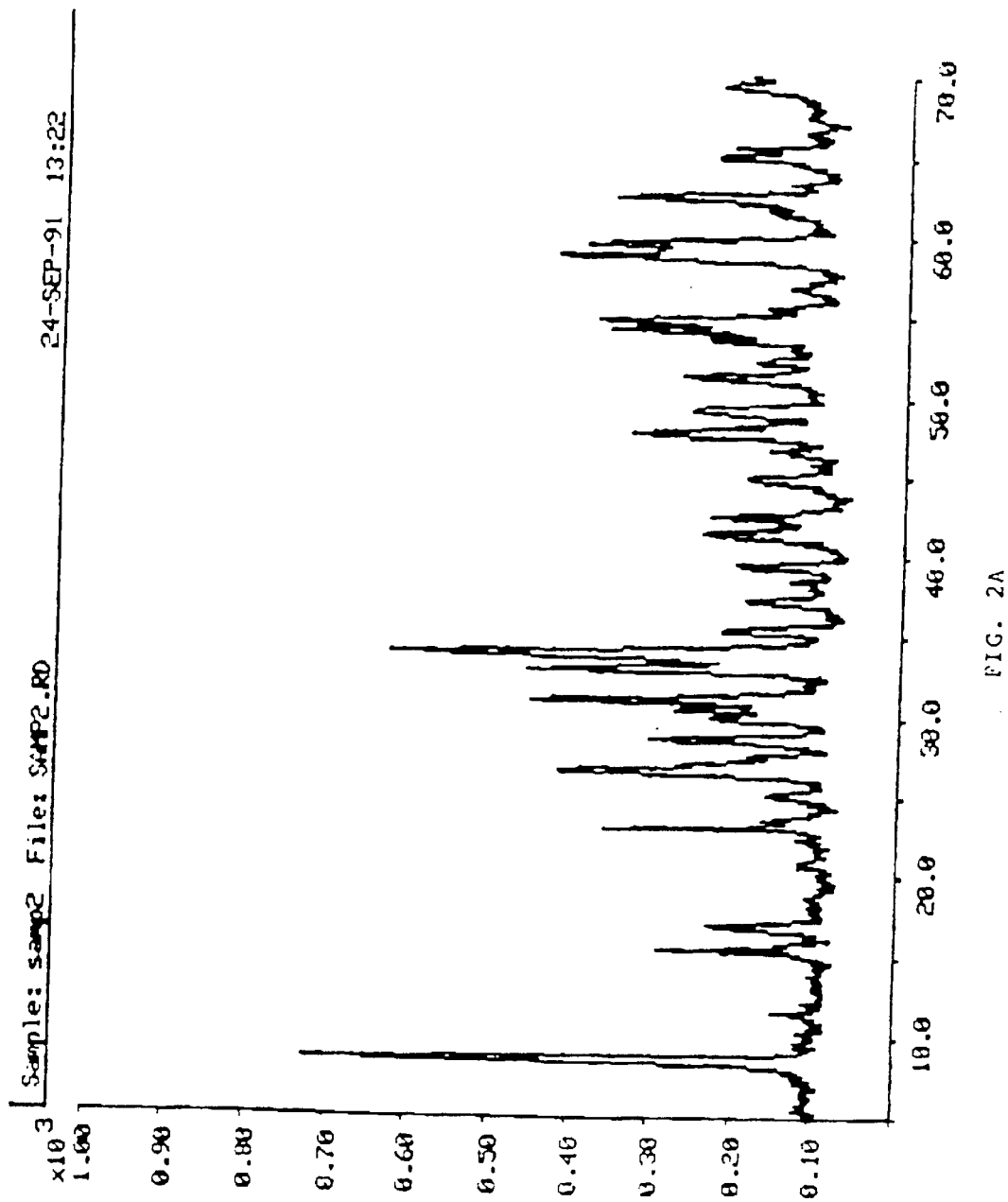
FIG. 2A is an X-ray diffraction of the precipitate obtained in Example 5 (many phases).
Figure 2B:
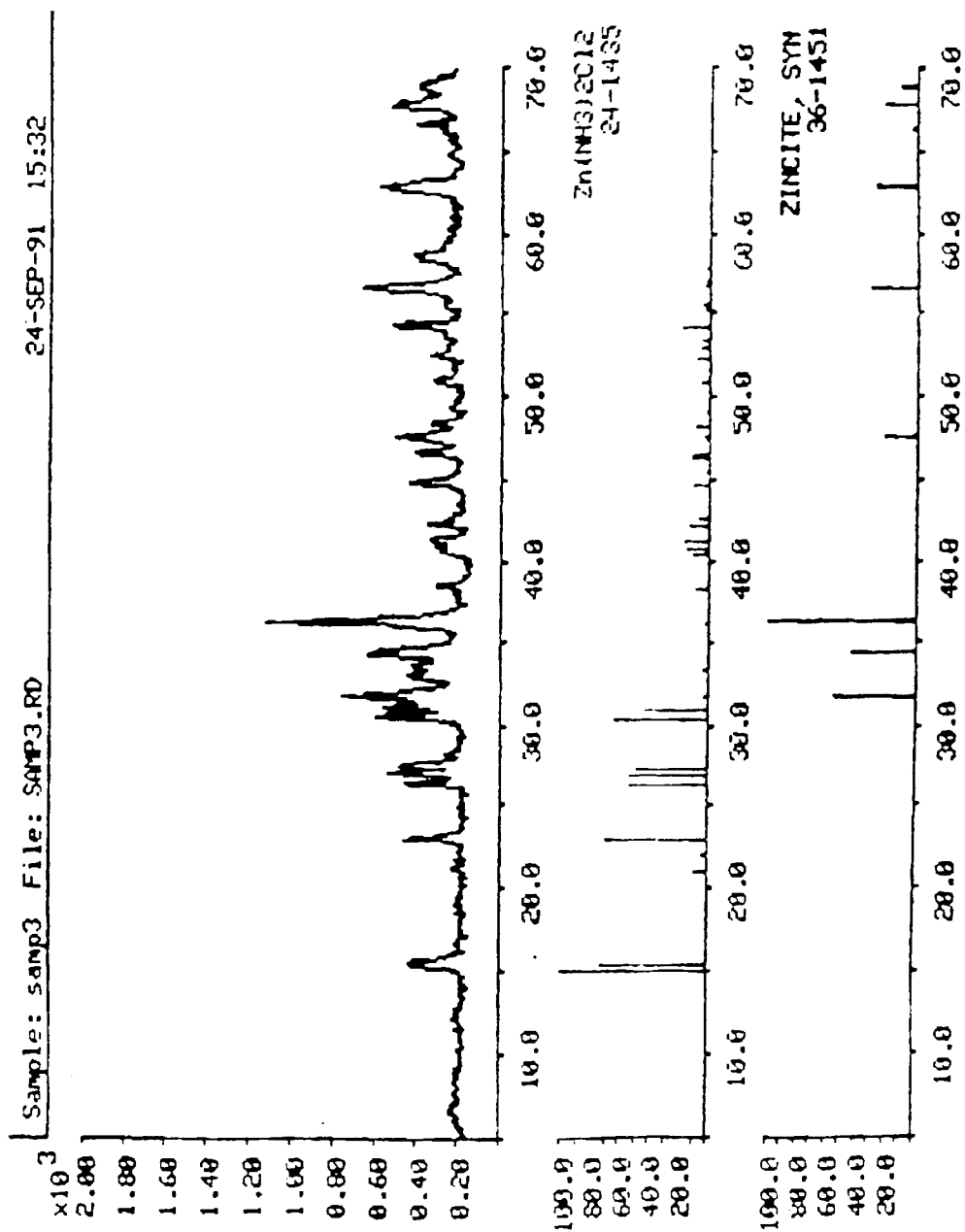
FIG. 2B is an X-ray diffraction of the precipitate after drying ZnO+Zn(NH$_3$)$_2$Cl$_2$.
Figure 2C:
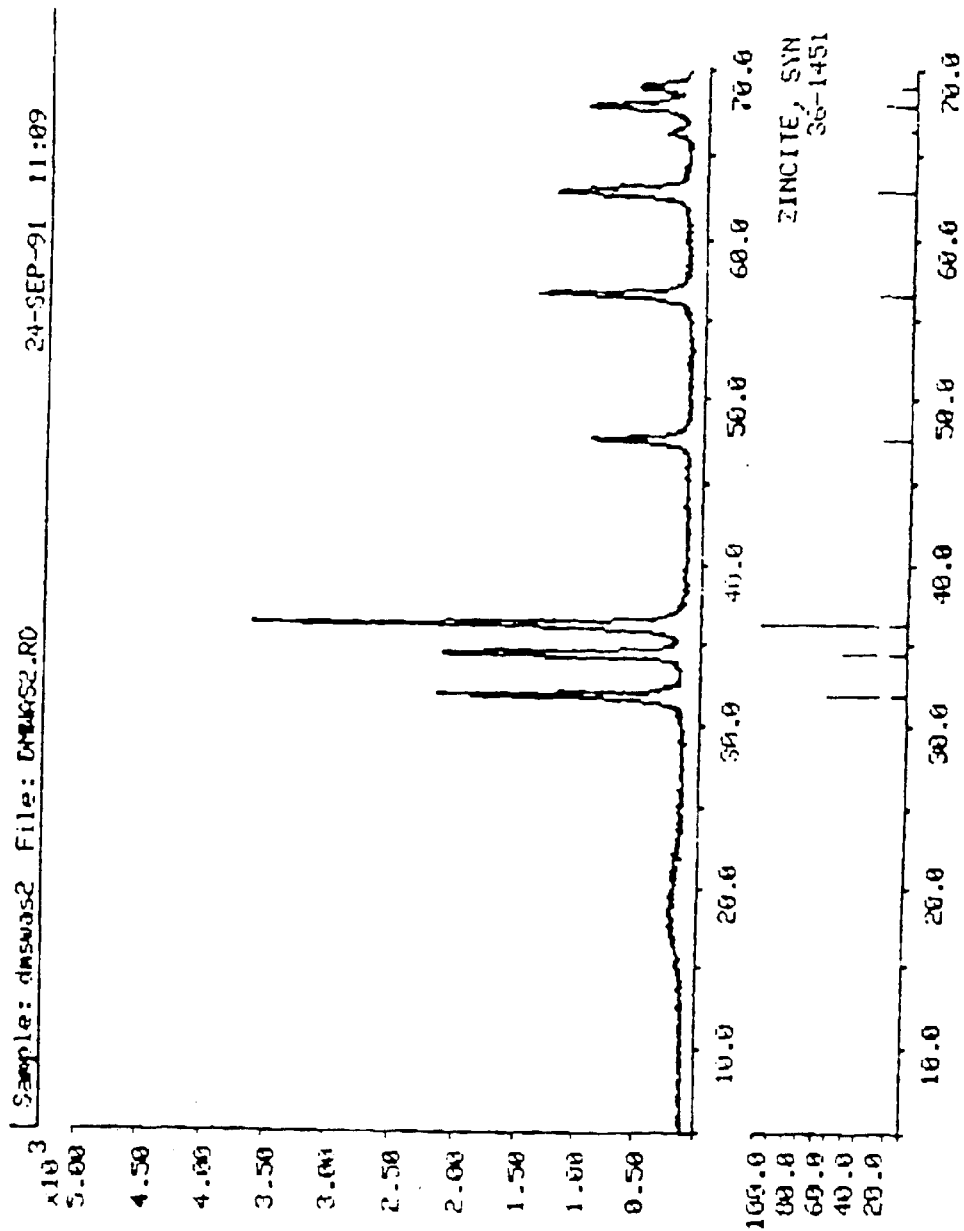
FIG. 2C is an X-ray diffraction of the precipitate after washing and drying ZnO.

The source of the zinc does not have to be dust. If pure ZnO is added to a 23% $NH_4Cl$ solution, the result is the same. As an example, saturated solutions of ZnO in 23% ammonium chloride solutions were prepared at temperatures ranging from 40° C.–90° C., using the solubility data of Table II. These solutions were then cooled to room temperature over a period of 1–2 hours. The resulting solid was filtered, washed in 90° C. water, and dried. As before, and as shown in FIG. 2A, the original solid was a mixture of hydrated zinc phases and diamino zinc dichloride. As shown in FIG. 2C, the final product was 99% ZnO. FIG. 2B shows the analysis of the intermediate zinc oxide and diamino zinc dichloride precipitate. The yields obtained as a fraction of the original solid precipitate are listed below:

| Temperature (° C.) | ZnO Added (g) | ZnO Obtained in Product (%) |
|---|---|---|
| 90 | 14.6 | 64 |
| 80 | 13.2 | 62 |
| 70 | 8.4 | 60 |

-continued

| Temperature (° C.) | ZnO Added (g) | ZnO Obtained in Product (%) |
|---|---|---|
| 60 | 5.0 | 60 |
| 50 | 3.7 | 45 |
| 40 | 2.3 | 40 |

These results indicate that the yield of ZnO improves as the amount of dissolved ZnO increases (which also means higher temperatures).

EXAMPLE 6

This example shows the process run in a continuous crystallization process to increase the throughput and to maximize the zinc oxide yield. The procedure of Example 1 is followed until the step in which the waste metals are precipitated out of the zinc oxide containing solution. Fifty gallons of the solution are used as the feedstock for a continuous crystallization process. The solution, initially at about 90° C., is pumped into a 1-gallon jacketed crystallizer equipped with baffles and a draft tube at a rate of 1 gallon per hour. The crystallizer jacket temperature is maintained at about 55° C. by use of a constant temperature circulating bath. The solution and the product crystals are removed continuously so as to keep the volume of material present in the crystallizer constant. At steady state, the temperature in the crystallizer is maintained at about 60° C. The product solution flows through a filter which collects the solid. The solid product then undergoes the washing and drying steps as discussed in Example 2. The yield of zinc oxide from this continuous crystallization process is about 60% of the total mass of the solid crystallized.

The crystallizer can be operated at lower temperatures; however, lower temperatures decrease the final yield of zinc oxide obtained as shown in Example 3. The flow rate employed also can be altered along with the crystallizer jacket temperature to minimize crystallization on the crystallizer vessel walls. In addition, these variables, along with the crystallizer jacket temperature, can be used to alter the crystal size distribution.

EXAMPLE 7

Metal dust of the composition shown in Table I is digested in 23% ammonium chloride solution at about 90° C. One gram of zinc metal dust is used per 10 grams of ammonium chloride solution. After one hour, the remaining solid is filtered out of the solution. 500 cc of the solution is put into each of two vessels with stirrers and the temperature of the solutions is maintained at 90° C. 500 ppm of Flocon 100 is added to one of the vessels, while nothing is added to the other vessel. Four-tenths of a gram (0.4 g) of 200 mesh zinc dust then is added to each of the two solutions. In the solution containing the Flocon 100, the zinc dust remains suspended, while in the other solution containing no additives, the zinc dust clumps together (flocculates). After one hour at about 90° C., the solids are filtered out of each of the solutions, weighed and analyzed. The mass of solid from the solution which contained the dispersant was 1.9 grams and comprised approximately 21% zinc, 75% lead, 2% cadmium and the remaining amount other metals. The mass of solid obtained from the solution with no dispersant was 1.2 grams and comprised approximately 33% zinc, 63% lead, 2% cadmium and the remaining amount other metals. From this example, it can be seen that the additional step of adding a dispersant increases the amount of lead and other metals removed from the waste stream in solution.

EXAMPLE 8

Crude crystals of diamino zinc dichloride were obtained using the procedure of Example 1. These crystals were washed with water at ratios of 0.1 lb. per gallon, 1.0 lb. per gallon and 2.0 lb. per gallon at temperatures of 80° C., 90° C., and 100° C. for a period of 5 minutes. The resulting crystals were dried and the surface area measured using the nitrogen BET method.

| Surface Area (m²/g) In Relation To Temperature (° C.) And Amount Of Water (lb./gallon) | | | |
|---|---|---|---|
| | 80° C. | 90° C. | 100° C. |
| 0.1 lb./gallon | 13.37 | 18.89 | 28.17 |
| 1.0 lb./gallon | 1.56 | 2.30 | 8.90 |
| 2.0 lb./gallon | 0.84 | 1.50 | 6.07 |

This example indicates that surface area can be controlled by both the use of temperature and dilution. It would also be possible to use temperature above 100° C. under pressure to achieve similar results. This principle can be employed to design washing conditions to produce zinc oxides of a desired average size and distribution.

A. Roasting Step for Enhanced Zinc Recovery

The EAF dust obtained from various sources have shown by chemical analysis to contain from 20%–25% zinc by weight. X-ray diffraction indicates clearly the existence of certain crystalline phases in this dust, specifically zinc oxide. The positive identification of the iron phase is complicated by the possible structural types (i.e. spinel type iron phases showing almost identical diffraction patterns). The zinc oxide (as well as smaller concentrations of lead or cadmium oxide) are removed from the initial dust by dissolution in a concentrated ammonium chloride solution (23% ammonium chloride).

Filtration and washing of the undissolved species leaves a residual powder. This powder shows a zinc concentration that is still elevated (i.e., 10–13% by weight), but that is not zinc oxide. X-ray diffraction indicates that all crystalline phases can be identified by spinel type phases. The combination of chemical analysis and x-ray diffraction indicates that this powder is a combination of magnetite (iron oxide: $Fe_3O_4$). Both of these phases have very similar spinel type structures. The zinc within the franklinte, $(Fe, Mn, Zn)XFeMn)_2O_4$, cannot be removed by dissolution with ammonium chloride. In addition, no simple extraction process will remove zinc from this stable oxide phase. Although this compound is very stable to oxidation (all elements in the highest oxidation state), it is relatively easy to destroy this compound by reduction at elevated temperatures. The reduction of the franklinite in an atmosphere that cannot readily reduce zinc oxide or allow for the rapid oxidation of zinc to zinc oxide following reduction and subsequently recover the zinc oxide by ammonium chloride extraction or sublimation (the highly volatile zinc oxide will sublime from the mixture at relatively low temperatures and recondense at the cold locations of the roaster). The alternative will be complete reduction of the franklinite to zinc metal and removal by distillation or separation of the molten zinc by settling techniques.

1. Roasting Process:

The roasting step can be carried out prior to the initial leaching step, or between a first and second leaching step. The powder containing the franklinite and magnetite, such as the waste dust, is heated to temperatures greater than 500° C. This temperature causes a reaction which causes a decomposition of the stable franklnite phase into zinc oxide and other components, and yet does not allow for the complete reduction of zinc oxide to zinc metal. The resulting zinc oxide can be removed by sublimation or extraction with an ammonium chloride solution, such as by following the steps detailed above under the general process. The resulting material after extraction has less than 1% by weight zinc.

The dust can be roasted using many conventional roasting processes, such as, for example, direct or indirect heating and the passing of hot gases through the dust. For example, non-explosive mixtures of reducing gases, such as for example hydrogen gas and nitrogen or carbon dioxide, can be passed through the powder containing franklinite and magnetite. Hydrogen gas is not the only species that may be used for reductive decomposition of franklinite. It is possible to use carbon or simple carbon containing species, including carbon-containing reducing gases and elemental carbon. Heterogeneous gas phase reductions are faster than solid state reductions at lower temperatures and therefore suggest the use of carbon monoxide. The carbon monoxide can be generated in situ by mixing the franklnte powder with carbon and heating in the presence of oxygen at elevated temperatures. The oxygen concentration is controlled to optimize CO production. The carbon monoxide may be introduced as a separate source to more clearly separate the rate of carbon monoxide preparation from the rate of Franklinite decomposition. The prepared zinc oxide then can be removed by either ammonium chloride extraction or sublimation.

The roasting process also can be performed to complete reduction by using carbon at high temperatures and collecting zinc metal that will melt at very low temperatures (420° C.) and boil at 907° C. In this process, zinc metal is obtained that, if desired, can be converted readily to the oxide by air roasting.

EXAMPLE 9

A dust containing 19.63% Zn, 27.75% Fe, 1.31% Pb, 9.99% Ca, and 0.024% Cd (analysis based on elements not oxides) was leached at 100° C. in a 23% ammonium chloride solution. The solid remaining after the leaching process was dried and analyzed to contain 12.67% Zn, 4.6% Ca, 35.23% Fe, 0.7% Pb, and 0.01% Cd. This material was placed in a quartz boat in the presence of activated carbon and heated at 900° C. for two hours in an atmosphere of 95% $N_2$ and 5% $O_2$. After two hours, the material was removed and added to a 23% ammonium chloride solution at 100° C. The material was filtered and dried at 140° C. for one hour to determine its composition. Analysis of this remaining solid was 42.84% Fe, 0.28% Zn, <0.1% Pb, and <0.01% Cd. The leached-roasted-leached material then can be subjected to the remainder of the general process to recover zinc oxide.

EXAMPLE 10

A dust with composition given in Table I is leached in 23% ammonium chloride solution for 1 hour at 100° C. The solid remaining (which contained 14% Zn) was placed in a quartz boat and heated to 700° C. in an atmosphere of 8% $H_2$ and 92% Ar. The material was cooled and reheated at 100° C. in 23% ammonium chloride solution at 100° C. The solid was separated, dried and analyzed for zinc. The zinc was found to be less than 1%. The leached-roasted-leached material then can be subjected to the remainder of the general process to recover zinc oxide.

2. Crystallization Step Variations:

The purpose of the crystallization/washing step is to produce a high purity zinc oxide of controlled particle size. This is accomplished through control of the temperature-time profile during cooling in the crystallization.

The crystallization step in the process takes the filtrate from the cementation step at 90–100° C. This filtrate contains the dissolved zinc with small amounts of trace impurities such as lead and cadmium. In order to prepare a pure zinc oxide it is necessary to prevent the formation of solvent inclusions inside the grown crystals. Solvent inclusions are pockets of liquid trapped as a second phase inside the crystals. Control of crystallization conditions can be employed to reduce these impurities. An example is given below.

EXAMPLE 11

A dust of the composition given in Table I is taken through the leaching and cementation steps. After cementation the filtrate is maintained at 100° C. 500 ml of this filtrate is placed in a jacketed stirred vessel with the jacket temperature at 100° C. The temperature is lowered in the crystallizer as follows:

| Time (minutes) | Temperature (° C.) |
| --- | --- |
| 0 | 100 |
| 60 | 90 |
| 120 | 75 |
| 180 | 55 |
| 210 | 25 |

The resulting solid was washed and dried employing the procedure described above. The resulting material was analyzed as follows:

| | |
| --- | --- |
| ZnO | 99 + % |
| Lead | <50 ppm |
| Cd | <25 ppm |
| Fe | <25 ppm |

The cooling profile in Example 11 is known as a reverse natural cooling profile. Such a profile is the opposite shape as that which is observed by natural cooling. In a reverse natural cooling profile, the cooling is slower at the beginning and faster at the end; in a natural cooling profile, the cooling is faster at the beginning and slower at the end. This type of cooling profile also is used to control the crystal size distribution (CSD) of the zinc oxide obtained. The cooling profile controls the ratio of nucleation (birth of new crystal) to crystal growth (growth of existing crystals). The ratio of nucleation/growth determines the final CSD.

EXAMPLE 12

A 23% ammonium chloride solution at 100° C. containing 11% by weight dissolved ZnO is divided into 4 portions. Each portion is placed in a jacketed agitated vessel. The cooling profiles in each vessel are given below:

| Time (minutes) | Temp. (° C.) |
| --- | --- |
| Vessel A | |
| 0 | 100 |
| 60 | 75 |
| 120 | 50 |
| 180 | 25 |
| Vessel B | |
| 0 | 100 |
| 60 | 50 |
| 120 | 37.5 |
| 180 | 25 |
| Vessel C | |
| 0 | 100 |
| 60 | 87.5 |
| 120 | 75 |
| 180 | 25 |
| Vessel D | |
| 0 | 100 |
| 60 | 87.5 |
| 120 | 75 |
| 180 | 62.5 |
| 270 | 25 |

The solid is washed using the usual procedures described previously. The average size and size distribution of these materials were measured using a laser light scattering particle size analyzer. The results were as shown below:

| Vessel | Mean Size |
| --- | --- |
| A | 22 |
| B | 19 |
| C | 27 |
| D | 37 |

The result show that controlling the temperature with a reverse natural cooling curver result in a larger average size than by linear cooling (A) or natural cooling (B). This principle can be employed to design cooling profiles to produce zinc oxides of a desired average size and distribution.

3. Recycle:

To produce pure zinc oxide from waste dust containing zinc efficiently and in a safe and cost effective way, the process recycles all zinc which is not removed from the leachate in the crystallization step. In addition, the diamino zinc dichloride which is redissolved in water in the washing step also is recycled. The recycle of zinc increases the overall zinc concentration in liquid solution in the process. This allows the crystallizer to operate at a higher temperature due to the rapid change in zinc oxide solubility with temperature in ammonium chloride solution. An example of the process with recycle is given below:

EXAMPLE 13

By controlling the recycle, the steady state zinc concentration can be raised to 7 g/100 g of solution. If the outlet of the crystallizer is kept at 60° C., 3 g/100 g solution of solid will crystallize (the solid is a mixture of zinc oxide and diamino zinc dichloride). The system does not have to be cooled further since this is an efficient way to operate to conserve energy (one does not have to cool then reheat the solution). In addition, operating at the higher Zn concentration improves the ratio of ZnO/diamino zinc dichloride produced in the crystallizer.

The recycle has the advantage that the solution become saturated relative to certain materials present in the dust, such as CaO. When this occurs, CaO no longer is leached from the dust but remains with the iron in the iron cake. This increases the value of the cake since CaO is still present and will not have to be added when the iron cake is fed to a flunace in steel making. Another important advantage in that there is no liquid effluent in this process. The only products are solid (iron cake, zinc oxide, and mixed metals including lead and cadmium, which are then sold for use in various industrial processes. No waste is produced since all liquid is recycled.

B. Carbon Addition Step for Recovery of Iron-Carbon and Direct-Reduced Iron Products The process also can be operated to produce a high-quality iron-carbon cake as a residual product. The iron oxide contained in the waste stream does not go into solution in the ammonium chloride solution, but is filtered from the product solution as undissolved material. This iron oxide cake can be used as is as the feedstock to a steel mill; however, it becomes more valuable if reduced by reaction with elemental carbon to produce an iron-carbon or direct-reduced iron product. One preferred method for producing such an iron-carbon or direct-reduced iron product from the waste material comprises the steps of:

a. treating the waste material with an ammonium chloride solution at an elevated temperature to form a product solution which comprises dissolved zinc and dissolved zinc oxide whereby any iron oxide in the waste material will not go into solution;

b. adding carbon to the product solution whereby the carbon will not go into solution; and then c. separating the product solution from any undissolved materials present in the product solution including any of the iron oxide and the carbon.

A mixture of iron oxide and carbon is used by the steel industry as a feedstock for electric arc furnaces. The iron oxide cake which is removed as undissolved material from the leaching step is primarily iron oxide, being a mixture of $Fe_2O_3$ and $Fe_3O_4$. The iron cake can be made into the mixture of iron oxide and carbon by adding elemental carbon to the iron oxide cake in several manners. First, carbon can be added to the leaching tank at the end of the leaching step but before the undissolved materials are separated from the product solution. Since the carbon is not soluble in the ammonium chloride solution and will not react in an aqueous solution, the iron cake and the carbon can be separated from the product solution and made into a hard cake. Different size carbon, such as dust, granules, or pellets, may be used depending on the desires of the steel makers. Second, the carbon can be added to the iron oxide after the iron oxide has been separated from the product solution. The dried iron oxide and the carbon can be ribbon blended in a separate process.

Combining carbon and iron oxide results in the reduction of the iron oxide, producing direct-reduced iron (DRI). DRI can be used to replace part or all of the steel scrap charged to a steel mill In some operations, DRI is preferred to scrap because it has a known uniform composition and generally contains no residual elements such as chromium, copper, nickel, and tin. Also, when DRI is melted, it forms a foamy slag because it contains both carbon and iron oxide. Because the price of steel scrap usually is lower than DRI, the use of DRI usually cannot be economically justified. DRI typically runs in the $120.00 per ton range. However, since the iron oxide is a residual product of this process, with the main value of the process being from the zinc oxide product, the iron oxide or direct-reduced iron can be produced more economically. Therefore, the iron oxide produced as a residual in this process has significant value.

The undissolved materials primarily comprise iron oxide and carbon which has significant value as a feedstock to a steel mill as discussed above. Generally the iron oxide and carbon product is pressed into a cake for ease of handling and use. The cake typically contains approximately 82% solids, but may range from 78% to 86% solids and be easily handled and used. Although cakes of less than 78% solids can be formed, the other 22%+of material would be product solution, which, if the cake is used as a feedstock to a steel mill, would be reintroduced to the steel-making process, which is uneconomical. Likewise, drying the cake to have more than 86% solids can be uneconomical. The product solution from this process can be treated similarly to the treatment of the product solution in steps d through j of the general method disclosed above.

The roasting process produces vapors, from the zinc, lead and cadmium and other impurities, that have to be condensed into dust. These impurities can be sent to the baghouse at the end of the steel making process, mixed into the original waste dust, and then sent to the first leaching step, in a recycle fashion. Alternatively, the exhaust vapors and dust from the roasting step may be sent to a separate baghouse at a stand alone facility.

There are two preferred ways to add carbon to the iron oxide cake. First, it may be beneficial when the iron oxide cake comes out of the reclamation process to grind up the iron oxide cake, pelletize it with carbon and put it in a roasting flunace. Second, carbon can be added to the furnace with the iron oxide.

The iron oxide cake can be treated in three manners. First, and least preferable, carbon can be added to the leaching step and the iron oxide cake will have carbon plus iron oxide. The iron oxide-carbon cake can go directly to the steel mill and, if it goes directly to the steel mill, then the reduction of the iron oxide would take place in the steel mill furnace. Second, and most preferable, the iron oxide-carbon cake can be pelletized and roasted in a reduction finance to form direct reduced iron. The iron oxide precipitate, which typically contains around 80% solids, is ground up with carbon and formed into pellets, briquettes or cubes and then heated. These pellets, briquettes or cubes then can be introduced to a steel making furnace. The difference in the material that would be introduced to the furnace from the first manner and the second manner is that in the second manner, direct reduced iron is introduced to the steel making flunace, while in the first manner, a combination of iron oxide and carbon is introduced to the steel making flunace. The iron oxide plus carbon can be supplied to the steel mill as is. When this carbon enriched iron oxide is melted, it forms a foamy slag, and a foamy slag is desirable in steel making. Third, the carbon can be added through a ribbon blender, and then the iron oxide-carbon cake can be introduced either directly into the furnace or, preferably roasted in a reduction furnace first to form direct reduced iron, which would be preferred for steel making.

In any manner, the fumes exhausting from the steel mill furnace and the reduction furnace typically are iron poor, but comprise other valuable components. The furnace exhaust fumes are an excellent source of iron poor waste materials useful for recovery in the present process. The exhaust furnaces may be filtered in a baghouse, with the resulting filtrate being added to the waste stream feed of the present process, or faith the resulting filtrate being the primary waste stream feed of the present process. The exhaust fumes also may be scrubbed in a wet scrubber, with the resulting loaded scrubbing solution being added to the ammonium chloride leachant of the present process. If an ammonium chloride scrubbing solution is used instead of water, the loaded ammonium chloride scrubbing solution may be used as the primary leachant of the present process.

C. Iron By-Product Recycle

Iron-rich by-products produced during the recovery process can be processed further to obtain an end product which can be recycled back into the leaching step of the recovery process of the present invention. The iron-rich by-products preferably are reduced to DRI in a reduction furnace. During the reduction process, exhausts fumes which consists primarily of zinc, lead and cadmium are produced in the reduction furnace.

In accordance with a first embodiment, the DRI is sent to a steel mill where it is used in the production of steel. The steel production process results in exhaust furnaces which are processed through the baghouse or/and a wet scrubber, either or both of which can be located at the steel mill. Fumes processed through the baghouse are filtered, and the captured solid residuum, along with an added amount of EAF dust, is recycled back into the waste materials stream whereby it is returned to the leaching step of the recovery process. Fumes processed through the wet scrubber are scrubbed in a liquid stream and the residual impurities obtained from the scrubbing process are discharged from the wet scrubber directly into the ammonium chloride solution of the leaching step.

In accordance with a second embodiment, the fumes exhausted from the reduction furnace used to produce the DRI are processed through the baghouse or/and the wet scrubber. Fumes processed through the baghouse are filtered, and the captured solid residuum is recycled back into the waste material stream, whereby it is returned to the ammonium chloride solution of the leaching step. In this embodiment, no EAF dust need be added in with the solid residuum. Fumes processed through the wet scrubber are scrubbed in a liquid stream and the residual impurities obtained from the filtering process are discharged from the wet scrubber directly into the ammonium chloride solution of the leaching step.

Therefore, iron-rich products which are produced during the recovery process of the present invention can be further processed to produce fumes consisting primarily of zinc, lead and cadmium which are captured in a baghouse or/and a wet scrubber and recycled back into the ammonium chloride solution of the leaching step to be used in the recovery process.

It should be noted that the locations of the baghouse and wet scrubber are a matter of design choice, plant efficiency and convenience. The present invention is not limited in this aspect. For example, steel mills are equipped with baghouses and wet scrubbers which can be used in the recycling process of the present invention. Similarly, the locations of the baghouse or wet scrubber used to process fumes from the DRI reduction furnace are also a matter of design choice, plant efficiency and convenience.

D. Electrolysis Step for Zinc Recovery

The process can be operated to recover zinc metal by replacing the crystallization steps with an electrolysis step. One preferred method for the recovery of zinc oxide from waste material streams which comprise zinc compounds using electrolysis comprises the steps of:

a. optionally treating the waste material a first time with an ammonium chloride solution at an elevated temperature to form a first product solution which comprises dissolved zinc constituents whereby any iron oxide in the waste material will not go into solution;

b. if the first ammonium chloride leach is used, separating the first product solution from the undissolved waste material compounds present in the first product solution including any of the iron oxide;

c. roasting the undissolved waste material compounds from the first leach, or roasting the waste material, at an elevated temperature and in a reducing atmosphere to create a roasted waste material compound;

d. treating the roasted waste material compound with the ammonium chloride solution at an elevated temperature to form a product solution which comprises dissolved zinc constituents whereby any iron oxide remaining in the roasted undissolved waste material compounds will not go into solution;

e. combining the first product solution, if the first ammonium chloride leach is used, with the product solution to form a combined product solution, maintaining the combined product solution at a temperature of at least 90° C., and adding powdered zinc metal and a dispersant to the combined product solution whereby any lead and cadmium ions contained within the combined product solution are displaced by the zinc metal and precipitate out of the combined product solution as lead and cadmium metals and the dispersant is selected from the group consisting of dispersants which will prevent the aggregation of the zinc metal;

f. separating the combined product solution from the lead and cadmium metals; and then g. subjecting the combined product solution to electrolysis to extract zinc metal from said combined product solution.

The combined product solution from the leaching steps comprises zinc ions in solution as $Zn^{2+}$. When the combined product solution is subjected to electrolysis in an electrolytic cell containing an anode and a cathode, the zinc metal is electrodeposited on the cathode. Although it is preferable to have the cathode made from zinc metal cathodes of other material also will allow the electrodeposition of zinc metal from the combined product solution.

Any of the electrolysis cells discussed in the literature are suitable, as long as such cells are configured for the electrolysis of zinc ion containing solutions. The two electrodes of the electrolysis cells are connected externally to a power supply capable of impressing a suitable voltage across the electrodes. The zinc ions, being positive in nature, migrate toward the negative electrode, or cathode, where they combine with electrons supplied by the external circuit to form neutral zinc metal atoms. When this happens, the zinc metal, in effect, electroplates onto the cathode. By using a zinc cathode, the entire cathode can be removed and used as necessary as a source of zinc. Alternatively, a cathode on which electroplated zinc metal can be easily removed can be used.

E. Periodic Precipitation of Other Solubles From the Product Solution

The product solution also contains sodium, potassium, magnesium, calcium, and other solubles in solution. These solubles can be recovered by introducing an electrolyte either in the leaching step or in the ammonium chloride storage tanks receiving the recycled product solution. As ammonium chloride is used as the leachant, ammonium salts in solution is the preferred electrolyte. For example, if some ammonium sulfate is added, one could precipitate out calcium sulfate. Ammonium sulfate is a preferred electrolyte to add because the process already uses ammonium in the form of ammonium chloride. The preferred electrolytes include ammonium sulfate, ammonium hydroxide, or ammonium carbonate to precipitate out various solubles.

F. Recovery of Ammonium Chloride and WashWater Purification

The wash water used to wash the zinc compounds precipitated from the product solution contains some ammonium chloride, as well as other compounds. Rather than dispose of this polluted wash water, it can be treated to produce pure water and a more concentrated solution containing ammonium chloride and other compounds. The pure water can be recycled to wash additional zinc compounds precipitated from the product solution, and the concentrated solution can be recycled back to the leaching step. The purification can be accomplished using evaporator condensers or reverse osmosis membrane technology.

From an economically competitive situation, the use of reverse osmosis membrane technology to filter the wash water containing ammonium chloride solution to obtain pure water on one side of the membrane and a concentrated ammonium chloride solution on the other side of the membrane, will save feed costs. Every so often it will be necessary to back flush the salts off of the membrane to recover them for makeup use in the future. In essence, reverse osmosis membrane technology is using a pump to pump the wash water through a membrane, which is significantly lower in cost than burning natural gas in an evaporator condenser to evaporate and recondense distilled water. This technology is used to filter out sodium chloride and the minerals out of sea water to make distilled water.

II. A PREFERRED EMBODIMENT OF THE ZINC OXIDE PURIFICATION PROCESS

Once the essentially pure zinc oxide has been recovered, as discussed above, a further zinc oxide purification process is utilized which, in a preferred embodiment, is based on the solubility of zinc oxide in a concentrated sodium hydroxide solution. As can be seen from FIGS. 3 and 4, the solubility of zinc oxide in sodium hydroxide increases significantly with increasing sodium hydroxide concentration. For example, a 16 molar sodium hydroxide solution (640 g per liter) wilt dissolve 4 mole (320 g) of zinc oxide. If this'solution is then diluted by a factor of 4, the solubility will decline so that approximately 180 g of zinc oxide/zinc hydroxide will precipitate. In accordance with the preferred embodiment, the zinc oxide purification process utilizes this phenomenon to produce zinc oxide which is at least 99.8% pure.

In the first step of the preferred process, zinc oxide is dissolved in a 50%–70% sodium hydroxide solution. Since most metals are not soluble in concentrated sodium hydroxide, most of the metal impurities in the zinc oxide will not dissolve, including manganese, iron and cadmium. Lead and calcium are soluble in concentrated sodium hydroxide and therefore will dissolve, as will chloride. The solution is then filtered to remove the undissolved materials which are then sent to the metals recovery section of the plant.

The solution is then diluted with water by a factor ranging from 3 to 30, but preferably 3 to 8, and optimally around 4, which appears to be optimum from the point of view of product recovery and energy costs. The best mode for the dilution step is performed hot at a temperature at or above 70° C. and preferably at temperatures ranging from 80 to 100° C. at atmospheric pressure. Temperatures below 70°, and temperatures above 100° C. at pressures greater than atmospheric, may be used, but are not as economically advantageous as in the preferred range. The hot temperatures cause the formation of zinc oxide to be favored over the formation of zinc hydroxide. The resulting zinc oxide crystals which form are then filtered out, sent to a wash tank where they are washed with water, and then sent to a dryer where they are dried, preferably at a temperature of 160° C.

The diluted sodium hydroxide solution is then sent to an evaporator condenser where the solution is concentrated back to 50%–70% sodium hydroxide and then reused. When a steady state has been achieved, this step results in the formation of sodium chloride crystal which will be filtered out of the solution and recovered. This is because sodium chloride formed by the chloride present in the zinc oxide is less soluble in concentrated sodium hydroxide solution than in dilute sodium hydroxide. After the sodium chloride is filtered out, the concentrated solution can be reused in the purification process.

Periodically, lead will be removed from the sodium hydroxide solution by cementation. This involves the addition of zinc dust which will displace the lead in solution. The lead will then be filtered out and sent to the lead recovery portion of the plant.

By controlling the rate of dilution of the sodium hydroxide solution or its method of addition during the zinc oxide crystallization step, it is possible to control the particle size hence the surface area of the zinc oxide produced. Furthermore, it should be observed that the zinc oxide purification process is not limited to the purification of zinc oxide recovered by the zinc oxide recovery process of the present invention and can be used to purify zinc oxide provided from any source.

Additionally, by selecting the method of addition of the intermediate solution, preferably sodium hydroxide, during the zinc oxide crystallization step, it is possible to control the particle size hence the surface area of the zinc oxide produced. It has been found that the smaller the droplet size in which the solution is added, the smaller the particle size (larger surface area). By dispersing the sodium hydroxide into droplets by a hydraulic atomizer, the particle size can be controlled. Additionally, at a constant droplet size, vigorous mixing will result in a larger surface area. The principle can be employed through selection of the appropriate droplet size and amount of mixing, to obtain highly purified zinc oxide with a predetermined surface area. This general relationship is shown in Table IV.

TABLE IV

| Approximate Droplet Size | Approximate Surface Area |
|---|---|
| 250 microns | 2.0 m$^2$/g |
| 180 microns | 3.0 m$^2$/g |
| 150 microns | 4.0 m$^2$/g |
| 100 microns | 10.0 m$^2$/g |

Figure 3:
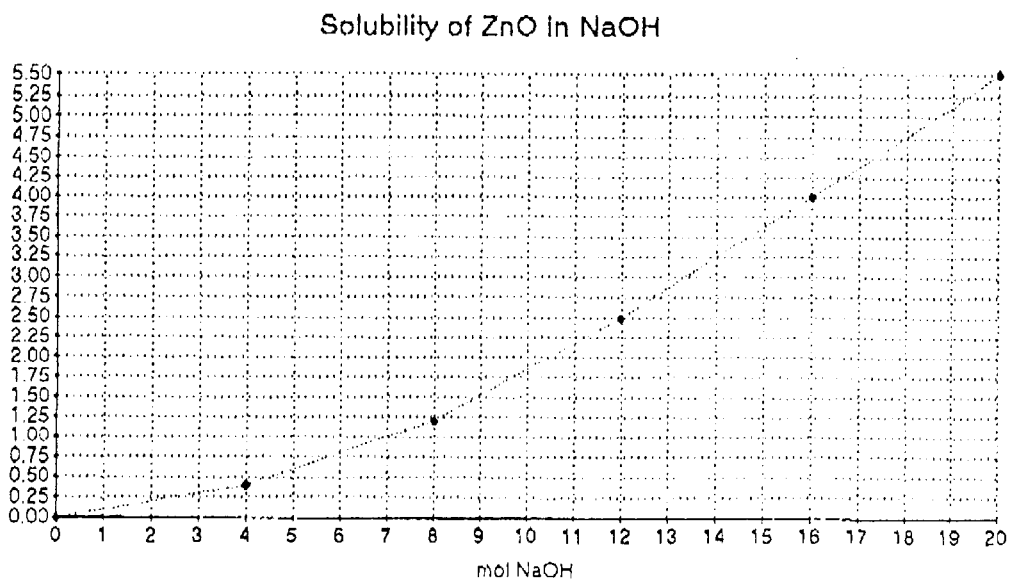
FIGS. 3 and 4 graphically illustrate the solubility characteristics of zinc oxide in a sodium hydroxide solution.
Figure 4:
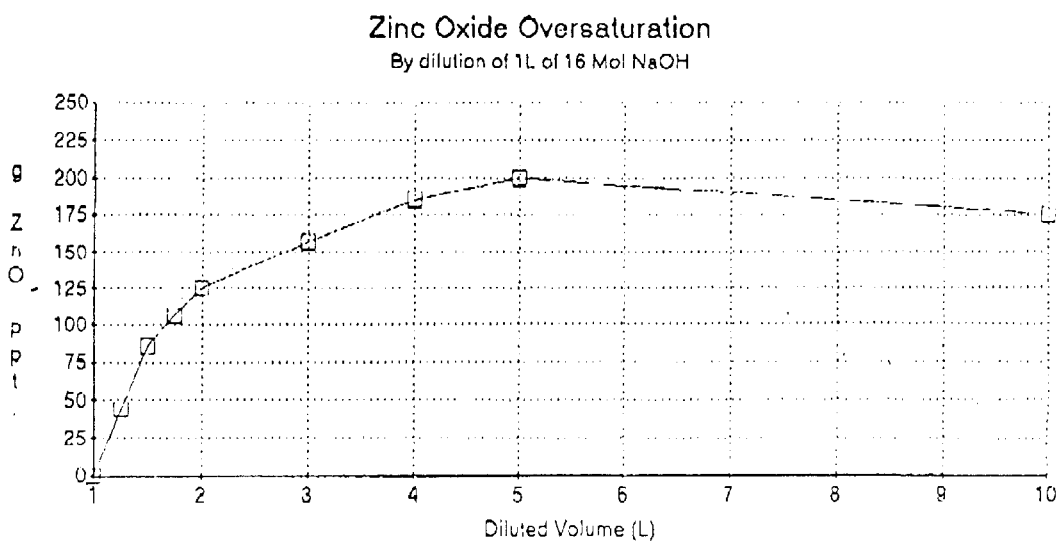

FIGS. 3 and 4 illustrate the solubility of zinc oxide in a sodium hydroxide solution. As shown in FIG. 3, as the concentration of the sodium hydroxide increases, the number of moles of zinc oxide which can be dissolved in the sodium hydroxide solution increases. As shown in FIG. 4, as the sodium hydroxide solution is diluted, the number of moles which can be dissolved in the solution decreases, i.e., the zinc oxide in the solution begins to precipitate.

This solubility characteristic of zinc oxide in sodium hydroxide is used by the present invention to purify zinc oxide by first dissolving the zinc oxide in a highly concentrated solution of sodium hydroxide and filtering out the impurities which do not dissolve, and then by diluting the sodium hydroxide solution to cause the zinc oxide to precipitate. By controlling the rate of dilution, the particle size and surface area of the zinc oxide produced can be controlled.

Figure 5:
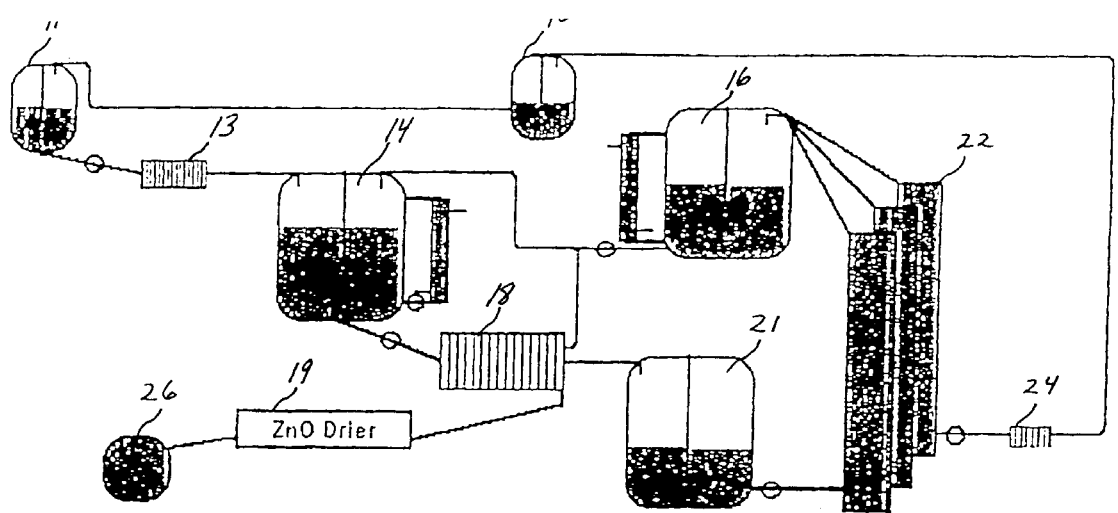
FIG. 5 is a schematic diagram illustrating the general zinc oxide purification process used in the present invention.

FIG. 5 illustrates a schematic diagram of the apparatus of the present invention for performing the purification process of the present invention in accordance with the preferred embodiment to obtain zinc oxide which is at least 99.8% pure. A hold tank 10 maintains a 50%–70% NaOH solution at 120° C. to 150° C. The zinc oxide-containing product to be purified is dissolved in the concentrated NaOH solution in digestion tank 11, which solution is delivered to digestion tank 11 from bold tank 10. The undissolved impurities are filtered out at tramp press 13 and the concentrated solution containing the zinc oxide is delivered to precipitation tank 14. The solution contained in precipitation tank 14 is then diluted at a predetermined rate with distilled water from tank 16. As discussed above, preferably the dilution takes place at a temperature ranging from 70° C. to 100° C., and preferably from 80° C. to 100° C., so that the formation of zinc oxide as opposed to zinc hydroxide is favored. The zinc oxide crystal precipitates due to the decreasing solubility of zinc oxide as the NaOH solution is diluted. The zinc oxide crystal is then filtered and washed with water in zinc oxide press 18. The zinc oxide crystal is then dried, preferably at approximately 160° C., in zinc oxide drier 19.

The diluted solution, after the zinc oxide crystal has been filtered out, is collected in feed tank 21 from which it is delivered to an evaporator condenser 22 which concentrates the solution back to 50%–70%. When steady state is achieved, sodium chloride crystals will form which are filtered out at NaCl press 24 as the re-concentrated NaOH solution is delivered back to hold tank 10 for reuse in the purification process.

Periodically, lead will be removed from the NaOH solution by cementation by adding zinc dust which displaces the lead in solution. The lead will be filtered out and sent to the lead recovery portion of the plant. The purified zinc oxide can be ground, sized and bagged at station 26.

The following examples illustrate how the purification process in accordance with the preferred embodiment results in a zinc oxide product which is at least 99.8% pure.

EXAMPLE 14

48 grams of NaOH are dissolved in 52 grams of distilled water making a 12 molar solution. 21 grams of zinc oxide is added making a saturated solution. The excess zinc oxide along with any insoluble impurities is filtered out. The zinc oxide used was obtained from the recovery process of the present invention and was approximately 1% chloride, 700 ppm manganese, 150 ppm iron, and 300 ppm lead.

The solution was then added to a volume of boiling water resulting in a dilution of 30 times. After boiling for a few minutes zinc oxide crystals appeared. These crystals were filtered dried and washed. They were then heated for one hour at 160° C. The resulting zinc oxide was a fine white powder with a surface area of 7.3 m$^2$/g as measured by the BET method. Analysis of the zinc oxide showed no detectable iron or manganese using DCP analysis. Lead was present at 160 ppm and chloride was under 50 ppm The material contained 99.8% or greater zinc oxide.

EXAMPLE 15

The same solution as used in Example 14 was prepared. The solution was added to a volume of boiling water resulting in a dilution by a factor of six. Zinc oxide crystals appeared rapidly. These crystals were filtered, washed, dried and then heated for one hour at 160° C. The resulting zinc oxide was a fine white powder with no detectable iron or manganese and a chloride content of less then 50 ppm The material contained 99.8% or greater zinc oxide.

EXAMPLE 16

The solution used in Example 14 was prepared and placed in a one liter vessel and kept at 90° C. Water at 90° C. was added slowly over a period of one hour until the solution was diluted by a factor of five. The resulting zinc oxide was filtered out and dried for one hour at 160° C. It was a fine white powder with no detectable iron or manganese and a chloride content of less then 50 ppd. The material contained 99.8% or more zinc oxide.

The type of intermediate used in the zinc oxide purification process will depend on the desired purity and particle characteristics to be obtained. For example, it has been determined that if ammonium sulfate is used as the intermediate instead of sodium hydroxide, the desired particle size of the purified zinc oxide can be obtained by controlling the cooling of the ammonium sulfate solution to precipitate zinc hydroxide, because the solubility of zinc oxide in ammonium sulfate is temperature dependent. The following example illustrates how this embodiment can be used to purify zinc oxide while obtaining desirable size and shape characteristics.

EXAMPLE 17

A saturated, boiling solution of 100 gm of ammonium sulfate in 10 g of water was prepared. Zinc oxide prepared from EAF dust by the ammonium chloride recovery process discussed above which contains 4% chloride ion was added to the solution. The saturated solution was filtered, maintaining the temperature above 95° C. The level of chloride in this zinc oxide affects the quantity dissolved in the ammonium sulfate. On cooling to 60° C. over 20 minutes zinc hydroxide was precipitated, filtered and washed. After heating to 300° C., 6 gm of zinc oxide having a surface area of 8 square meters per gram was obtained. The product has a considerably reduced level of chloride ion (below 0.0 1%) and also a lower lead content.

Intermediates other than sodium hydroxide and ammonium sulfate can also be used to precipitate zinc oxide having the desired purity and particle characteristics. The following intermediates are chosen in accordance with the desired purity and particle characteristics to be obtained: ammonium chloride liquor, ammonium phosphate, potassium hydroxide, ammonia/ammonium oxalate and ammonia/ammonium carbonate solutions.

EXAMPLE 18

121 g zinc oxide containing 2% chloride, 200 ppm lead, 100 ppm manganese, 50 ppm iron are added to 100 ml of sodium hydroxide solution (50% by weight) at 100° C. The solution was filtered to remove any insoluble materials and then added to 300ml of water at 100° C. The solution is stirred and the resulting zinc oxide is filtered washed and dried. The zinc oxide obtained has no measurable lead, manganese or iron present and has under 50 ppm chloride. The surface area is 1.8 $m^2/g$.

This experiment was then repeated with the sodium hydroxide solution being dispersed into droplets by a hydraulic atomizer. The average droplet size of the solution was 180 microns. The resulting zinc oxide had a surface area of 3.0 $m^2/g$. The composition was the same.

III. ALTERNATIVE METHODS OF PRODUCING IRON FEEDSTOCKS

Two alternative methods of producing iron feedstocks using the purification method have been developed. First is a method for the production of a feedstock which comprises usable iron constituents and a purified zinc oxide product from industrial waste streams, comprising the steps of combining a first waste material stream which is iron poor and comprises non-iron constituents with a second waste material stream which comprises iron and non-iron constituents to produce a waste material combination, wherein at least one of said waste streams comprises zinc oxide; roasting the waste material combination at an elevated temperature of at least 500° C. in a reducing atmosphere prior to treating the waste material combination with an ammonium chloride solution; treating the waste material combination with a sodium hydroxide solution to form a product solution which comprises dissolved non-iron constituents and an undissolved precipitate, whereby any non-leachable metals and metal compounds in the waste material combination will be contained in the undissolved precipitate and will not go into solution; separating the product solution from the undissolved precipitate; roasting the undissolved precipitate at an elevated temperature to reduce any iron oxide in the waste material combination into direct reduced iron, resulting in the production of a feedstock which comprises usable iron constituents; diluting the product solution at a predetermined rate by a factor ranging from 3 to 30 at a temperature ranging from 70° C. to 100° C. to precipitate zinc oxide crystals; filtering out the zinc oxide crystals and washing the zinc oxide crystals in water; and drying the zinc oxide crystals.

Second is a method for the production of a feedstock which comprises usable iron constituents and a purified zinc oxide product from one or more industrial waste streams, at least one of which comprises zinc oxide, comprising the steps of scrubbing a first waste material stream which is iron poor and comprises non-iron constituents; combining the scrubbant and a second waste material stream which comprises iron and non-iron constituents with a sodium hydroxide solution to form a product solution which comprises dissolved non-iron constituents and an undissolved precipitate, whereby any non-leachable metals in the waste material combination will be contained in the undissolved precipitate and will not go into solution; separating the product solution from the undissolved precipitate; roasting the undissolved precipitate at an elevated temperature to reduce any iron oxide in the waste material combination into direct reduced iron, resulting in the production of a feedstock which comprises usable iron constituents; diluting the product solution at a predetermined rate by a factor ranging from 3 to 30 at a temperature ranging from 70° C. to 100° C. to precipitate zinc oxide crystals; filtering out the zinc oxide crystals and washing the zinc oxide crystals in water; and drying the zinc oxide crystals.

IV. PRODUCTION OF ZINC COMPOUNDS FROM ZINC OXIDE

The zinc oxide produced by this process can be used to make a number of other zinc compounds. Those include, zinc acetate, zinc borate, zinc bromate, zinc carbonate, zinc chloride, zinc chromate, zinc hydroxide, zinc nitrate, zinc phosphate, zinc stearate, zinc gluconate, zinc sulfate, and zinc EDTA salt. This list is not exhaustive and many other zinc compounds can be made by adding the appropriate reactants to the zinc oxide slurry.

Commercial zinc oxide is usually made by combustion of zinc vapor in air and is collected as a dry powder. The zinc oxide prepared as described herein is a precipitate in aqueous solution. This allows a range of downstream chemicals to be manufactured by addition of the appropriate acid to the zinc oxide slurry. Well known methods of producing zinc compounds by the addition of the appropriate acid can be used in the current invention.

The zinc compounds can be manufactured by the invention directly without having to suspend or dissolve the dry zinc oxide. Synthesis of zinc compounds by this method also obviates the need to dry zinc oxide obtained from the purification process described above. Both simple commodity chemicals and specialty products having a particular physical or chemical properties can easily be made by employing this process in conjunction weigh the methods to control particle size of the zinc oxide described above.

EXAMPLE 19

A stoicliiometric quantity of sulfuric acid was added to the zinc oxide aqueous slurry. The zinc oxide dissolved to give a zinc sulfate solution. Zinc sulfate solution is used in rayon manufacture and in agriculture.

EXAMPLE 20

A slight stoichiometric excess of stearic acid was added to the zinc oxide aqueous slurry. It was heated with agitation to 60° C. to melt the stearic acid. As the melt temperature is approached, the stearic acid reacted with the zinc oxide to produce fine particle size zinc stearate. Fine particle size zinc stearate is used in the rubber and paint industries.

The above description sets forth the best mode of the invention as known to the inventor at this time, and the above Examples are for illustrative purposes only, as it is obvious to one skilled in the art to make modifications to this process without departing from the spirit and scope of the invention and its equivalents as set forth in the appended claims.

What is claimed is:

1. A method for purifying zinc oxide to obtain zinc oxide and other zinc compounds having predetermined purity and particle characteristics comprising the steps of:
   a. dissolving a zinc oxide containing product in an intermediate to form an intermediate solution;
   b. filtering out any undissolved materials from the intermediate solution;
   c. precipitating zinc oxide crystals out of the intermediate solution in a controlled manner such that the zinc oxide crystals have predetermined purity and particle characteristics, by diluting the intermediate solution by adding the intermediate solution in droplets of predetermined size to water; and
   d. filtering out said zinc oxide crystals.

2. The method of claim 1, further comprising the step of:
   e. washing said zinc oxide crystals.

3. The method of claim 2, further comprising the step of:
f. drying said zinc oxide crystals.

4. The method of claim 2, further comprising the step of:
f. adding an acid to said zinc oxide crystals; wherein said acid reacts with the zinc oxide to form a zinc compound.

5. The method of claim 4, wherein said acid is selected from the group consisting of acetic acid, boric acid, bromic acid, carbonic acid, chromic acid, nitric acid, phosphoric acid, stearic acid, gluconic acid, hydrochloric acid, sulfuric acid, and edetic acid.

6. The method of claim 1 wherein the intermediate solution is diluted by a factor ranging from 3 to 30 by volume at a temperature ranging from 70° C. to 100° C.

7. The method of claim 6 wherein the intermediate solution is diluted by a factor of 3–8 by volume at a temperature of approximately ranging from 80° C. to 100° C.

8. The method of claim 1 wherein the intermediate is selected from the group consisting of sodium hydroxide, ammonium sulfate, ammonium chloride liquor, ammonium phosphate, potassium hydroxide, ammonia/ammonium oxabate, and ammonia/ammonium carbonate solutions.

9. The method of claim 8 wherein the intermediate is a concentrated 50%–70% sodium hydroxide solution.

10. The method of claim 9 wherein said droplets are between 100 and 300 microns in size.

11. The method of claim 10 where said droplets are between 150 and 250 microns in size.

12. A method for purifying zinc oxide and other zinc compounds comprising the steps of:
   a. dissolving zinc oxide-containing product in a concentrated sodium hydroxide solution to form an intermediate solution;
   b. filtering out any undissolved materials from the intermediate solution;
   c. dispersing said intermediate solution into droplets between 100–300 microns in size;
   d. combining said droplets with a sufficient amount of 70° C. to 100° C. water to dilute the intermediate solution by a factor of 3 to 30 by volume, thereby precipitating zinc oxide crystals; and
   e. filtering out said zinc oxide crystals.

13. The method of claim 12 further comprising the steps of:
   f. washing said zinc oxide crystals in water; and
   g. adding an acid to said zinc oxide crystals; wherein said acid reacts with the zinc oxide to form a zinc compound.

14. The method of claim 13, wherein said acid is selected from the group consisting of acetic acid, boric acid, bromic acid, carbonic acid, chromic acid, nitric acid, phosphoric acid, stearic acid, gluconic acid, hydrochloric acid, sulfuric acid, and edetic acid.

15. The method of claim 12 wherein, in step (c), said droplets are between 150 and 250 microns in size.

16. The method of claim 12 wherein the size of said droplets in step (c) is controlled to obtain zinc oxide crystals having a desired surface area.

17. The method of claim 12, wherein, in step (d), said amount of water is sufficient to dilute the intermediate solution by a factor of 3 to 8 by volume.

18. The method of claim 12 wherein, in step (d), said water is at a temperature ranging from 90° C. to 100° C.

19. The method of claim 12 wherein, after step (e), the intermediate solution is concentrated to a contain 50%–70% sodium hydroxide by weight for reuse in step (a).

* * * * *